US009418669B2

(12) United States Patent
Emerson, III

(10) Patent No.: US 9,418,669 B2
(45) Date of Patent: Aug. 16, 2016

(54) DISCOVERY OF MUSIC ARTIST AND TITLE FOR SYNDICATED CONTENT PLAYED BY RADIO STATIONS

(71) Applicant: Harry E. Emerson, III, Flanders, NJ (US)

(72) Inventor: Harry E. Emerson, III, Flanders, NJ (US)

( * ) Notice: Subject to any disclaimer, the term of this patent is extended or adjusted under 35 U.S.C. 154(b) by 0 days.

(21) Appl. No.: 13/892,304

(22) Filed: May 12, 2013

(65) Prior Publication Data

US 2014/0336798 A1    Nov. 13, 2014

Related U.S. Application Data

(60) Provisional application No. 61/646,327, filed on May 13, 2012, provisional application No. 61/646,326, filed on May 13, 2012, provisional application No. 61/646,324, filed on May 13, 2012, provisional application No. 61/646,330, filed on May 13, 2012, provisional application No. 61/646,329, filed on May 13, 2012, provisional application No. 61/647,184, filed on May 15, 2012.

(51) Int. Cl.
| | | |
|---|---|---|
| *G06F 17/00* | (2006.01) | |
| *G10L 19/018* | (2013.01) | |
| *H04H 60/58* | (2008.01) | |
| *G06F 17/30* | (2006.01) | |
| *H04H 60/65* | (2008.01) | |
| *H04H 60/66* | (2008.01) | |
| *H04H 60/74* | (2008.01) | |

(52) U.S. Cl.
CPC ........ *G10L 19/018* (2013.01); *G06F 17/30743* (2013.01); *H04H 60/58* (2013.01); *H04H 60/65* (2013.01); *H04H 60/66* (2013.01); *H04H 60/74* (2013.01); *H04H 2201/37* (2013.01); *H04H 2201/90* (2013.01)

(58) Field of Classification Search
CPC ...... G10L 19/018; H04H 60/58; H04H 60/65; H04H 60/66; H04H 60/74; H04H 2201/37; H04H 2201/90; G06F 17/30761
USPC .......................................................... 700/94
See application file for complete search history.

(56) References Cited

U.S. PATENT DOCUMENTS

| | | | | |
|---|---|---|---|---|
| 6,570,080 B1 * | 5/2003 | Hasegawa et al. | ............. | 84/609 |
| 6,990,453 B2 * | 1/2006 | Wang et al. | ................... | 704/270 |
| 7,289,643 B2 * | 10/2007 | Brunk et al. | ................. | 382/100 |
| 7,343,141 B2 * | 3/2008 | Ellis et al. | .................... | 455/132 |
| 7,421,376 B1 * | 9/2008 | Caruso et al. | ................ | 702/190 |

(Continued)

OTHER PUBLICATIONS

ID3 draft specification; copyright 2000.*

(Continued)

*Primary Examiner* — Paul McCord

(57) ABSTRACT

Radio stations broadcasting syndicated content for which the broadcast automation system is not provided with the artist and title of songs has a software application in an associated computer that receives and analyzes the audio stream to detect songs, and creates a digital fingerprint of the songs. Fingerprints are compared against an acoustic fingerprinting song database to obtain the artist and title of the song. When a match is discovered, the song artist and title are provided to encoding software that inserts the artist and title into the radio station's digital broadcast for receipt and display by compatible radio receivers, and are transmitted on the Internet to simulcast media players of listeners for presentation of the artist and title of songs as they are playing.

6 Claims, 16 Drawing Sheets

(56) References Cited

U.S. PATENT DOCUMENTS

| | | | |
|---|---|---|---|
| 7,516,074 B2* | 4/2009 | Bilobrov | 704/270 |
| 7,778,591 B1* | 8/2010 | Van Hoff et al. | 455/2.01 |
| 7,870,088 B1* | 1/2011 | Chen et al. | |
| 8,010,988 B2* | 8/2011 | Cox | 725/110 |
| 8,296,791 B2* | 10/2012 | Steuer et al. | 725/18 |
| 8,316,015 B2* | 11/2012 | Svendsen et al. | 707/722 |
| 8,453,170 B2* | 5/2013 | Briggs et al. | 725/22 |
| 8,639,178 B2* | 1/2014 | Anniballi et al. | 455/3.01 |
| 8,718,805 B2* | 5/2014 | Glitsch et al. | 700/94 |
| 8,768,495 B2* | 7/2014 | Selby et al. | 700/94 |
| 8,843,316 B2* | 9/2014 | Martin | H04W 4/185 701/409 |
| 2002/0072982 A1* | 6/2002 | Barton et al. | 705/26 |
| 2002/0099555 A1* | 7/2002 | Pitman et al. | 704/500 |
| 2002/0178410 A1* | 11/2002 | Haitsma et al. | 714/709 |
| 2002/0183059 A1* | 12/2002 | Noreen et al. | 455/427 |
| 2003/0061363 A1* | 3/2003 | Bahl | H04L 63/08 709/229 |
| 2003/0163823 A1* | 8/2003 | Logan | H04H 20/28 725/89 |
| 2004/0199387 A1* | 10/2004 | Wang et al. | 704/243 |
| 2005/0044561 A1* | 2/2005 | McDonald | 725/18 |
| 2005/0086682 A1* | 4/2005 | Burges et al. | 725/19 |
| 2005/0283795 A1* | 12/2005 | Steelberg | G06Q 30/02 725/32 |
| 2006/0003753 A1* | 1/2006 | Baxter, Jr. | 455/414.3 |
| 2006/0059277 A1* | 3/2006 | Zito et al. | 710/15 |
| 2006/0074769 A1* | 4/2006 | Looney et al. | 705/26 |
| 2006/0206582 A1* | 9/2006 | Finn | 709/217 |
| 2006/0287915 A1* | 12/2006 | Boulet | G06Q 30/02 705/14.61 |
| 2007/0016918 A1* | 1/2007 | Alcorn | G06F 17/30743 725/22 |
| 2007/0067482 A1* | 3/2007 | Johnson et al. | 709/231 |
| 2007/0111709 A1* | 5/2007 | De Luca et al. | 455/411 |
| 2007/0124789 A1* | 5/2007 | Sachson et al. | 725/117 |
| 2007/0198660 A1* | 8/2007 | Cohen | 709/219 |
| 2008/0051029 A1* | 2/2008 | Witteman et al. | 455/17 |
| 2008/0183757 A1* | 7/2008 | Dorogusker et al. | 707/104.1 |
| 2009/0061764 A1* | 3/2009 | Lockhart et al. | 455/3.06 |
| 2009/0249222 A1* | 10/2009 | Schmidt et al. | 715/751 |
| 2010/0131558 A1* | 5/2010 | Logan | G06Q 50/184 707/783 |
| 2010/0146542 A1* | 6/2010 | Weihs | H04N 7/17318 725/34 |
| 2010/0211693 A1* | 8/2010 | Master et al. | 709/238 |
| 2010/0305729 A1* | 12/2010 | Glitsch et al. | 700/94 |
| 2010/0325022 A9* | 12/2010 | Ben-Yaacov et al. | 705/30 |
| 2011/0015968 A1* | 1/2011 | Carlson | 705/10 |
| 2011/0099197 A1* | 4/2011 | Wang et al. | 707/769 |
| 2011/0244784 A1* | 10/2011 | Wang | 455/2.01 |
| 2012/0239175 A1* | 9/2012 | Mohajer | G06F 17/30743 700/94 |
| 2013/0097302 A9* | 4/2013 | Khedouri et al. | 709/224 |
| 2013/0124596 A1* | 5/2013 | Damman et al. | 709/201 |
| 2013/0179275 A1* | 7/2013 | Harb | 705/14.73 |
| 2014/0106708 A1* | 4/2014 | Samari et al. | 455/410 |
| 2014/0108441 A1* | 4/2014 | Samari et al. | 707/758 |
| 2014/0180818 A1* | 6/2014 | Mistler et al. | 705/14.57 |
| 2014/0273908 A1* | 9/2014 | Englert | 455/345 |
| 2014/0288940 A1* | 9/2014 | Grant | G10L 19/167 704/500 |
| 2015/0067512 A1* | 3/2015 | Roswell | G06F 17/30769 715/716 |

OTHER PUBLICATIONS

Video Fingerprinting; c2009.*
Video Fingerprinting for Copy Identification; c2009.*

* cited by examiner

DISCOVERY OF MUSIC ARTIST AND TITLE FOR SYNDICATED CONTENT PLAYED BY RADIO STATIONS

CROSS REFERENCE TO RELATED APPLICATIONS

This application claims the benefit under 35 U.S.C §119(e) of U.S. Provisional Application No. 61/646,327, U.S. Provisional Application No. 61/646,326, U.S. Provisional Application No. 61/646,324, U.S. Provisional Application No. 61/646,330, and U.S. Provisional Application No. 61/646,329, all filed May 13, 2012, and U.S. Provisional Application No. 61/647,184 filed May 15, 2012, and the entire disclosure of each is incorporated herein by reference.

BACKGROUND OF THE INVENTION

1. Field of the Invention

The present disclosure relates to obtaining artist and title information via an Internet resource for music from syndicated shows transmitted on broadcast radio.

2. Description of the Prior Art

In the radio broadcast industry, the over-the-air broadcast is referred to as a "terrestrial" broadcast, differentiating from satellite and Internet broadcasts. The delivery of a terrestrial broadcast on the Internet is commonly referred to as webcasting, simulcasting, or streaming. Beyond commercial AM/FM radio broadcasts that simulcast on the Internet, there are numerous Internet-only music broadcasters, such as Pandora, Beethoven, last.fm, iTunes, and many others, whose listenership has become a very significant portion of all Internet music listenership. In addition to these sources of music, there are other technologies of interest, as follows.

Broadcast Radio Provisioning of Artist and Title for Songs

As of this writing in 2012, there are two established broadcast radio technologies that enable a radio station to transmit artist and title metadata associated with the currently playing song for presentation on a display associated with the radio receiver. These two technologies are known as RDS, and HD radio. For either of these technologies to work the radio station must have a mechanism for associating metadata with a song. The mainstream approach is the use of a Broadcast Automation System, which holds the digitized versions of the music along with the metadata for that music, and incorporates a scheduling system which actually plays out the music and sends it to the radio station's audio chain which delivers it to the transmitter system. The Broadcast Automation System also has a digital data output which can output the metadata associated with a song, or other data, to an external system. In the case of RDS, for example, that metadata will be sent to an RDS digital encoder, typically a standalone box, which will modulate the textual metadata onto an FM subcarrier; the subcarrier then gets mixed with, and transmitted with, the broadcast audio signal. Radio receivers equipped for RDS will decode the RDS data stream for the tuned-in station, extract the artist and title information, and cause the display that information in an appropriate place or manner on an associated display screen. In a case of auto radio receivers, that display screen might be part of the radio itself, or it might be a multipurpose display that is shared with vehicle navigation and other vehicle functionality. For both RDS and HD radio, it has been a common practice in the industry for the automation system to send radio station identifiers such as the radio station call letters, frequency, slogan, and nickname ("The Power", "Kiss 107", "The Breeze") as part of the metadata output.

Digital Signal Processing, and Beat Detection

There is an associated and well-known technology, that of beat detection, identification and beat matching in systems used by DJs and radio stations to segue from one song to the next. Beat matching is a well-studied mathematical science in the field of digital signal processing, and there are commonly available software modules that a programmer can incorporate into his system to build in beat identification and beat matching.

Acoustic Fingerprinting of Audio Materials and Music

Further, there are systems and service providers on the Internet that utilize a technology called acoustic fingerprinting (or audio recognition, acoustic recognition, or similar terms) which uses a mathematical algorithm to associate a digital "fingerprint" of audio material, such as a song or commercial, with the name or other identifier of the audio material itself from an audio content database (a song database). A song database is comprised of records of songs wherein each record is a mathematical representation of a song, typically consisting of a series of fingerprints of various points in the song. Each record is associated with one or more identifiers of the song, particularly the artist and title of the song. In one method of operation of these systems for the recognition of songs, a snippet of a song is sent to the system in a digitized format such as MP3, the snippet is fingerprinted, the fingerprint is compared against a database of fingerprints, and if a close match is found, that match identifies the song from which the snippet is derived. Having identified the song, the system then returns information to the requester about the song, such as the artist and title and album information, or takes other appropriate actions according to the business nature of the service provider. While there may be intermediate steps on the part of any individual system or service provider, from the viewpoint of that system or service as a utility the operation is the same: pass in a snippet of a song, and receive back metadata about the song if it exists in their database.

According to common knowledge, acoustic fingerprinting was developed by the US military decades ago to recognize voices. Although esoteric, it is well-known and well-studied in certain mathematical fields, especially those associated with digital signal processing. As of this writing there are multiple services available on the Internet that provide song identification via acoustic fingerprinting in a fashion comparable to that just described.

In one implementation, acoustic fingerprinting service providers (such as Media Monitors LLC, ASCAP [American Society of Composers, Authors and Publishers], and Broadcast Music Inc. [BMI]) provide a monitoring and auditing function for radio stations, or other clients that wish to audit radio stations, to verify that a radio station has played their commercials according to agreement, or to identify and track the songs played by a radio station. In this implementation, the service provider will arrange to have one or more radio receivers installed a listening area, one receiver per radio station wherein the receiver is permanently tuned to that station. The audio output (line out, or headphone out) of each receiver is physically connected to a co-located computer. A computer may be provisioned with multiple sound cards to allow for connections from multiple receivers (i.e., four sound cards will allow the connection of four radio receivers). Thus, to monitor 1,000 radio stations in 60 listening areas, the service provider must arrange for the installation and maintenance of 1,000 radio receivers in 60 physical locations. If the associated computers were configured with four sound cards each (assuming there is no other limiting parameter), 250 computers are required. The computers digitize the audio from each associated radio receiver into a suitable format such as mp3 and send the stream of digitized audio to the service provider for acoustic fingerprinting. The service provider analyzes each received audio stream using fingerprinting techniques to determine the commercials played and time-of-day, which information is subsequently made available in reporting formats to the clients of the service provider.

Some of the agencies listed above, plus others such as TuneSat.com, provide similar services on behalf of music rights holders by monitoring television channels to detect music embedded in TV programs or commercials.

In a variation of this business model, the acoustic fingerprinting service providers (such as Yes.com, Nielsen), configured as just described, determine the artist and title of songs that have played, and make that information available to their radio station clients via proprietary Internet connection arrangements in a controlled and limited fashion so song information can be displayed on the radio station's website, or on an Internet media player configured to play the radio station's content. In these configurations, the use of a proprietary connection enables the display of only the most current song, and induces the audience to click through to the service provider's own website to access the listings of previous songs. The service providers monetize the visits of listeners that click through in this fashion by the presentation of ads, and by offering songs on the playlist for sale.

In another quite different implementation, acoustic fingerprinting service providers (such as Shazam and SoundHound) provide a smart phone application for users. In this implementation, when a user hears an interesting song from an ambient source (background music in a store or office, a friend's radio, etc.), the user turns on their smart phone and starts the app. The app turns on the microphone of the smart phone, digitizes the audio it "hears", and sends that audio stream to the service provider. The service provider fingerprints the audio, as previously described, determines the name of the song and the artist, and delivers that information back to the app where it is displayed for the user. The song is then offered for sale, and the user is presented opportunities to explore similar songs, and to purchase them as well.

Device that Hears What You Hear

Arbitron provides audience measurement and ratings for the radio broadcast industry in the United States. Traditionally Arbitron enlisted volunteers to self-report their listening history by recording that information in a diary and mailing it back to Arbitron. Multiple volunteers are enlisted in each listening area targeted for study. A few years ago Arbitron introduced an automated technology called the Portable People Meter (PPM), a wearable device with a continuously-on microphone that hears what the wearer hears. Radio stations participating in Arbitron surveys install an encoder that impresses a unique identifying code in the form of an inaudible series of tones onto the radio station's broadcast signal. PPMs listen for these inaudible tones, and record the number of instances, duration, and time of day for each station the volunteer has listened to during the study period. Only radio stations transmitting these codes can be detected by the PPM. Although the radio station audio is heard by the PPM in order to detect the tones, the nature or content of the audio other than the tones is ignored by the PPM and is neither identified nor recorded. The PPMs are inserted into a dock at night which charges the PPM and uploads the data to Arbitron servers.

SUMMARY

The embodiments disclosed herein are based in part on the wide-spread use of smart phones (and cell phones, tablets, and similar mobile and wireless devices in general) for the consumption of entertainment, especially music, by the individual users of those devices. Much the same as the Personal Computer has, in fact, become a personal device, used by a single person for the management of their affairs, the smart phone has assumed that role and, even further, become the epitome of that paradigm for portable devices. It is a pocket-sized personal communications, personal digital assistant (PDA), and personal entertainment system.

In particular, the use of a smart phone as an entertainment device, especially for music, is expanding rapidly. But even so, musical consumption is splintered. Going back some years, we would hear music from juke-boxes at a diner, from broadcast radios in cars and at home, from television, even in elevators, and piped into the office. While we are still exposed to music from most of these sources, the trend now is to listen to music personally; that is, rather than music coming through speakers that many can hear, now it comes through ear-buds or headphones that only one person can hear—the smart phone owner. But even though the portion of music experienced through a smart phone is "personal", the sources of music for any individual can be fragmented—from radio receivers in the car and home, perhaps some from the Internet broadcast of one or more radio stations, perhaps from Internet-only sources such as Pandora or Slacker, and perhaps from any of hundreds or thousands of other potential sources.

Presently, the ability to present artist and title information for listeners of broadcast radio is dependent upon the radio station transmitting that information as part of its broadcast signal. In the United States as of 2012, RDS and HD radio are poorly adopted by radio broadcasters, and therefore a large percentage of broadcast radio music listenership cannot benefit from the availability of music metadata. Music listeners appreciate knowing the artist and song title, and therefore it would be valuable if that data could be provided independently. There sometimes are indirect ways for a radio station to provide artist and title data for their simulcast even though they don't provide it for their terrestrial broadcast, nevertheless, a significant percentage of commercial radio simulcast on the Internet does not provide artist and title information for the music they play.

Further, although most of the Internet-only music broadcasters provide artist and title information for the music they deliver, and even though Pandora or Slacker or any other interactive Internet source might provide a "Like" button, or a "buy" button, the result to the user is still fragmented—a "Like" on Pandora does not relate to a "Like" on a radio station's simulcast, and building a playlist on Slacker does not integrate with playlists and custom channels built elsewhere.

Even for those sources that provide artist and title data, listeners who utilize more than one source of musical content do not have a ready way of centralizing the provided artist and title metadata and associated information surrounding the music they have heard, into an effective body of knowledge that they can use to enhance their musical experience, such as consolidating artist and title and associated information from diverse Internet sources into a common repository comprising favorite songs, songs they have purchased, songs they like and might want to purchase, etc., selecting their favorites from songs they have heard, sharing favorites and other musical information with others, creating playlists and custom music channels, and the purchase of songs and albums.

The above shortcomings are addressed in the various embodiments of this disclosure.

Embodiments disclosed herein may utilize two existing technologies to detect the presence of music, to determine when a new song begins, and to obtain the artist and title of a detected song. The detection of presence of music and the detection of the beginning of a new song are achieved through the implementation of digital signal processing (DSP) mathematical techniques commonly used by DJ software to perform "beat matching" to segue from one song to the next. Once a song is detected, a snippet of it is sent to and analyzed by an Internet-based "acoustic fingerprinting" service provider which uses the snippet as a lookup key (or "fingerprint") into a song database to find the associated metadata for the song, especially the name of the song and the artist.

In one embodiment there is a method and a system for a smart phone application (herein, an "app", or "smartphone app", or "song ID app"), or an inherent capability of the smart phone itself (i.e., cell phone), such as by a feature of the smart phone operating system, to monitor the audio output of an associated radio receiver system via a wireless connection such as Bluetooth, and to determine when that audio output constitutes music, then to identify the song and its associated artist and title, optionally along with other associated song metadata, from an acoustic fingerprinting service provider on the Internet, to show that metadata on the radio receiver's display, and to store that artist and title information for the user in the app for subsequent engagement and pursuit of their musical interests. In this fashion, this embodiment provides the ability to identify every song heard by the user through an associated radio receiver system, regardless of the source of that music, and to keep a listing of those songs for all the purposes a user might desire. The cellular phone may communicate with a system on the Internet via standard cellular data communications technologies such as 3G, 4G, or WiFi.

Another embodiment relates to obtaining artist and title information for music delivered to and played by smart phones (and cell phones, generally) in the circumstance where that information is not provided by the broadcaster, and where that information, whether or not it is provided by the broadcaster, is obtained and made available via a smart phone app.

Still another embodiment provides for obtaining artist and title information for music heard by a listener in possession of a smart phone (or, generally, a cell phone) wherein the smart phone is provisioned to continuously "listen" to ambient sounds via the smart phone microphone, and consequently "hear" whatever the user hears, even when the smart phone display is off. Such a capability is common in voice recording apps. This embodiment is a method and a system for a smart phone application (herein, an "app", or "smartphone app", or "song ID app"), or an inherent capability of the smart phone itself such as by a feature of the smart phone operating system or electronic design, to electronically and internally monitor the smart phone microphone and to detect the presence of music.

The song ID app has the capability to determine when the ambient audio comprises music, and when the presence of music is detected, to send a portion of that music to an online acoustic fingerprinting service provider to determine the artist and title of the song, and upon the reply of that service provider, to enter the artist and title and any other available song information into a listing for immediate or future access by the user for the pursuit of their musical interests. In this fashion, these embodiments provide the ability to identify every song heard by the user, regardless of the source of that music, and to keep a listing of those songs for all the purposes a user might desire.

And yet another embodiment relates to an improved method and system for auditing radio stations and other broadcasters. In this embodiment, a "desktop" or PC or server application running at the radio station (or other convenient location) receives the station's audio output that will be transmitted over the air. Software in the PC application detects changes in the nature of the audio content, such as from one song to another, from a song to DJ chatter, from DJ chatter to a commercial, or from one commercial to another to identify audio segments representing unique audio elements. Associated acoustic fingerprinting software fingerprints each identifiable segment of audio content. Fingerprints are transmitted via the Internet to an acoustic fingerprinting service provider that has a fingerprinting database of songs, commercials, and any other content of interest. The acoustic fingerprinting service provider looks up the fingerprint in its database and obtains the artist and title of the song, or an identifier for the song, or commercial, or other audio content. The acoustic fingerprinting service provider stores records of detected songs and commercials played by a broadcaster, and produces reports from database analyses regarding the names, frequencies, times-of-day, etc. that the various contents of interest are played. Of significant benefit, the majority of physical plant associated with the prior art arrangements for providing radio station auditing is eliminated; specifically, the embodiment just described replaces the requirement to have a physical radio receiver and associated computer in a physical location geographically within radio reception range of the radio station.

Another embodiment relates to obtaining artist and title metadata for radio stations broadcasting syndicated content. In this embodiment, a "desktop" or PC or server application running at the radio station (or other convenient location) receives the station's audio output that will be transmitted over the air. Software in the PC application detects changes in the nature of the audio content, such as from one song to another, from a song to DJ chatter, from DJ chatter to a commercial, or from one commercial to another. Associated acoustic fingerprinting software fingerprints each identifiable segment of audio content. Fingerprints are transmitted via the Internet to an acoustic fingerprinting service provider that has a fingerprinting database of songs and any other content of interest. The acoustic fingerprinting service provider looks up the fingerprint in its database and obtains the artist and title of the song. The acoustic fingerprinting service provider then provides the song metadata back to the PC application at the station. In one arrangement, the PC application delivers that metadata to a system such as an RDS system for inclusion in the terrestrial broadcast. In another arrangement, the PC application delivers that metadata to a digital encoder system, which converts the analog audio (or audio/video, in the case of a television station) into a digital format for transmission on the Internet for simulcasting to an Internet audience. The digital encoder system transmits the artist and title information along with the digitized audio of the song to media players on the Internet.

In another mode of operation of this embodiment, the acoustic fingerprinting service provider, directly or indirectly provides this metadata to Internet media players of the radio station's content, optionally in a proprietary format such that only the artist and title of the current song is displayed, and requiring listeners to click through to a website of the acoustic fingerprinting service provider, or an associated entity, to obtain similar information for previously played songs.

Other aspects and advantages of the disclosed embodiments will be apparent upon consideration of the drawings and detailed description, which follow.

BRIEF DESCRIPTION OF THE DRAWINGS

The disclosures and embodiments will be more fully understood when reference is had to the following detailed description and the accompanying drawings, in which.

DETAILED DESCRIPTION

Figure 1:
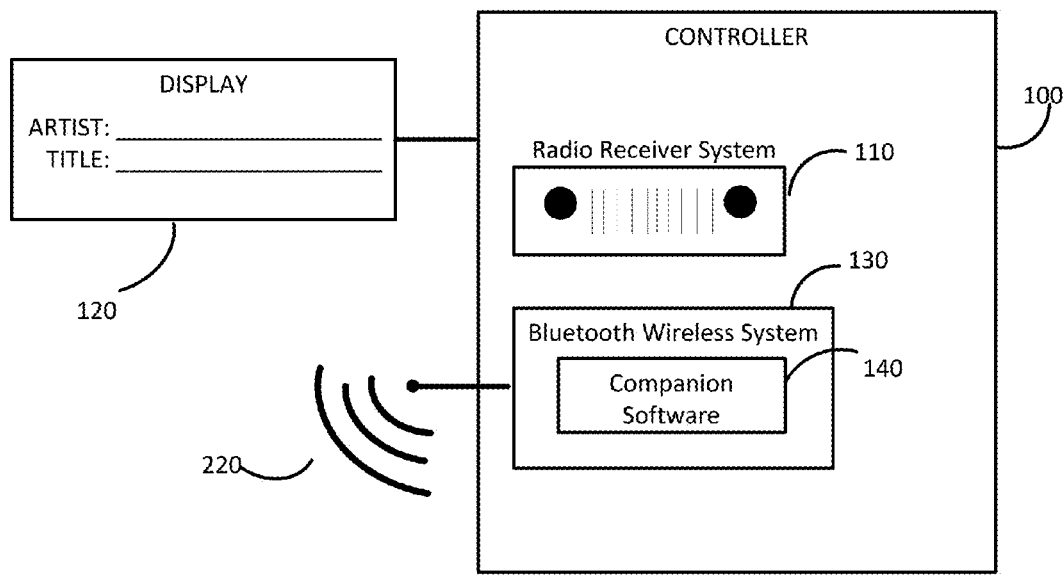
FIG. 1 is a schematic illustration of an embodiment applicable to automobile radios which do not incorporate an embedded cell phone.
Figure 1:
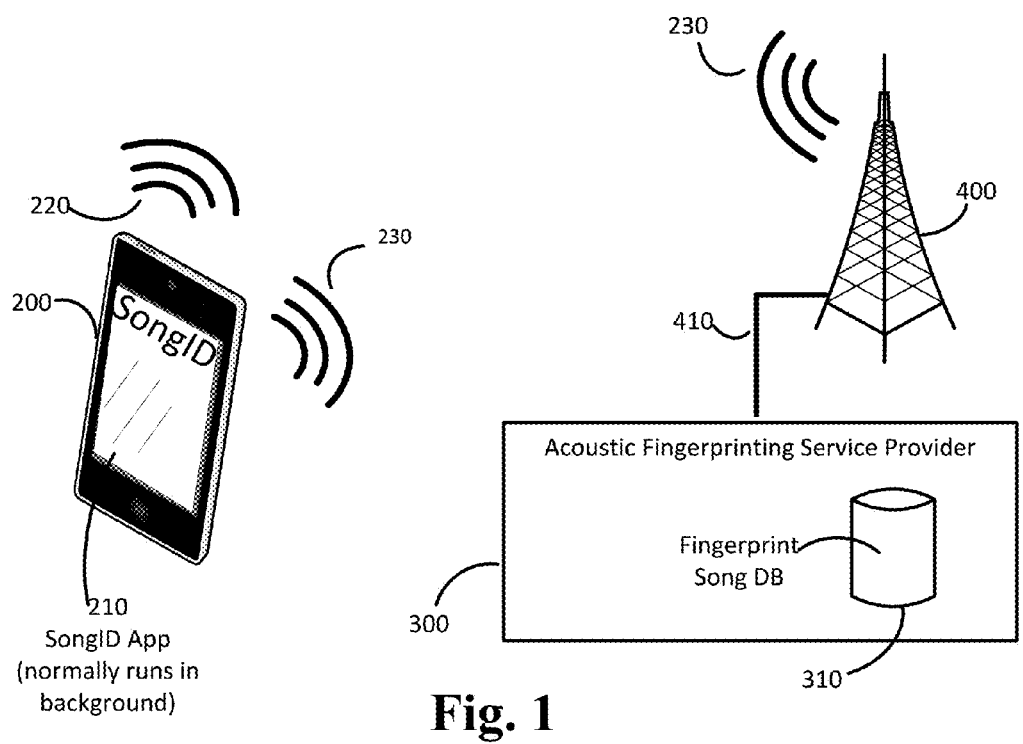

What follows are detailed descriptions of exemplary embodiments, but the scope of the invention is defined by the claims that follow the detailed descriptions and is not limited to the disclosed embodiments.

Digital Signal Processing, Beat Detection, and Music Detection

Modes of operation as disclosed herein may take advantage of a well-known technology, that of beat detection, identification and beat matching in systems used by DJs and radio stations to segue from one song to the next. As previously mentioned, beat matching is a well-studied mathematical science in the field of digital signal processing, and there are commonly available software modules that a programmer can incorporate into his system to build in beat identification and beat matching. The purpose of beat identification and beat matching in various embodiments as disclosed herein is to determine the presence of music and the beginning of the next song.

The mathematics of acoustic and music analysis is a broad field of science, and there are many algorithms including and beyond beat identification to determine the presence of music and the beginning of a song. For example, the paper, "Audio Content-Based Feature Extraction Algorithms Using J-DSP for Arts, Media and Engineering Courses", 978-1-4244-6262-9/10/Session T1F-1 2010 IEEE, incorporated herein in its entirety by reference, describes several standard approaches commonly taught in college DSP courses to achieve feature extraction of audio content. "A typical set of features for audio signals includes tonality, pitch (perceived fundamental frequency), temporal energy, harmonicity, timbre, spectral centroid, bandwidth and the Mel-Frequency Cepstral Coefficients (MFCC)." Tonality is a measure of the signal's tone-like versus noise-like characteristic, and thus tonality is an indication of the presence of musical content. Pitch represents the periodicity inherent in the temporal domain or the perceived fundamental frequency of the underlying signal, and thus the presence of an identifiable pitch is another indication of the presence of musical content. The measurement of temporal energy can be used to ignore sections of audio content having silent or noise-like characteristics. The measurement of harmonicity indicates the degree of periodicity and the degree of harmonics of the fundamental frequency, and is a further indication of musical content. One characteristic of music is the presence of tonality, beats, harmonics, etc., over longer periods of time than voice, and thus the presence of these indicators over larger time frames, fractions of a second and longer compared to milliseconds for voice, can be used to identify the presence of music. The cited reference merely describes the general nature of college-level courses that explore DSP analysis of audio and musical content; there is a rich body of technical literature that provide intricate details regarding the implementation of these concepts.

Radio Receiver Embodiments

In the following embodiments there are methods and systems that enable the attainment of music artist and title information, as well as other information related to a currently playing song, for music played by radio broadcast receivers independently of whether or not that information is transmitted by the broadcaster.

These embodiments relate to all types of radio receivers including car radios, tabletop radios, portable radios, boom boxes, and home stereo receiver systems, and takes advantage of the display capabilities of displays built into the radio itself, as well as display systems associated with the radio receiver, such as dashboard displays, televisions, navigation systems, as well as on the user's smart phone. Some of these devices such as automobile radio receivers directly or indirectly have Bluetooth local wireless networking, and some have Wi-Fi.

In yet another embodiment the radio receiver system may incorporate cell phone technology, as is common among some automobile manufacturers. For example some General Motors models incorporate their proprietary OnStar system which is built around an embedded cell phone capability, and some other auto manufacturers incorporate a similar embedded cell phone capability to report service notifications and issues to the owners and dealers. This embodiment is similar to the embodiment just mentioned, except that the communication between the song app and the acoustic fingerprinting service provider on the Internet is carried over the automobile's cell phone wireless path in either voice mode or data mode.

In this embodiment the app receives the identification of every song played through the radio receiver, and it keeps a record of these songs, including other associated and optional information such as the station or source, if available, and the time played. Having those listings, it can offer the user a Like button for each song heard to aid the user in keeping a listing of favorite songs, it can present advertising targeted to the songs or the genres associated with those songs, and it can offer the user the ability to purchase the songs or the albums.

It should be understood that in some circumstances the radio receiver is part of a system, rather than standalone, and that system may incorporate the logic and processing to enable the sending of an audio stream to a cell phone song app and the receipt of metadata from that app regarding the song being played, as well as the posting of selected metadata returned by the app onto the display system. For example, in an automobile with a radio receiver and display system, a vehicle onboard computer may manage the contents to be displayed, among them being radio station information, navigation system, vehicle settings and customization, etc. In another circumstance the radio receiver may be part of a home theater and stereo system. In this configuration the television may be the display system, and the computerized electronics that determine what data is to be displayed may be shared by various devices such as a cable TV set-top box, a radio receiver, a Blu-ray player, and the TV itself. Therefore these embodiments should be construed as a computerized control device associated with a radio receiver such that it can send an audio stream from the radio receiver to an associated wireless device such as a cell phone running a compatible app, receive the returned metadata about the song, and cause the presentation of that metadata on a display. The connection between the radio receiver and the cell phone may be wired (the cell phone may be an integral part of the system, or the cell phone may be in a dock that is wired to the system, etc.), or the connection may be wireless such as via Bluetooth.

FIG. 1 is a schematic illustration showing an embodiment applicable to automobile radio receiver systems, as well as to other radio receiver systems. In this embodiment, a radio receiver, such as a car radio, having a Bluetooth connection to a smart phone carried by someone in the vehicle, uses the wireless capability of that smart phone to obtain artist and title information, as well as other optional related information, for every song being played on the radio. In this embodiment, the radio receiver sends a continuous stream of the audio output to the cell phone via Bluetooth in addition to sending it to the speakers. The smart phone is enabled to obtain artist and title information (metadata) for the songs played on the radio, as represented by the continuous stream of audio from the radio receiver, from an acoustic fingerprinting service provider on the Internet. Optionally, the smart phone returns artist and title information to the radio receiver system for presentation on its display, and also optionally, the smart phone presents that information on its own display.

The radio receiver system comprises a radio receiver system and controller 100, a radio receiver 110, a display system 120, and a Bluetooth wireless system and transceiver 130 which incorporates companion software 140 that works with the song ID app 210 in the smart phone 200.

The radio receiver and Bluetooth wireless assembly are shown within the bounds of a controller system 100 such as might be found in the modern automobile where most aspects of the driver interface to accessories is operated under a centralized computer controlling system. This block diagram configuration is presented for illustrative purposes in that a system designer might choose from many possibilities in creating a particular system design.

The smart phone incorporates a song ID app 210, Bluetooth wireless networking 220, and conventional cell phone wireless connectivity 230. The cell phone connects by conventional cell phone wireless transmission 230 to a cell phone tower 400. In the current common cell phone wireless network design, a cell phone tower connects via a network gateway system provided by the wireless service provider (not shown), which connects the wireless service provider's network to the worldwide Internet backbone system 410. Optionally the smart phone may connect to the Internet via Wi-Fi arrangement (not shown).

The acoustic fingerprinting service provider 300 incorporates fingerprinting song database 310, and is located on the Internet and is accessible via data packets sent from the cell phone 200, and can communicate similarly in the reverse direction. In various embodiments as disclosed herein, the communication between the smartphone song ID app 210 and the acoustic fingerprinting service provider 300 on the Internet may be carried over the cell phone's wireless path 230 in either voice mode or data mode, or via Wi-Fi through a wireless router and then across the wired broadband network.

Figure 2:
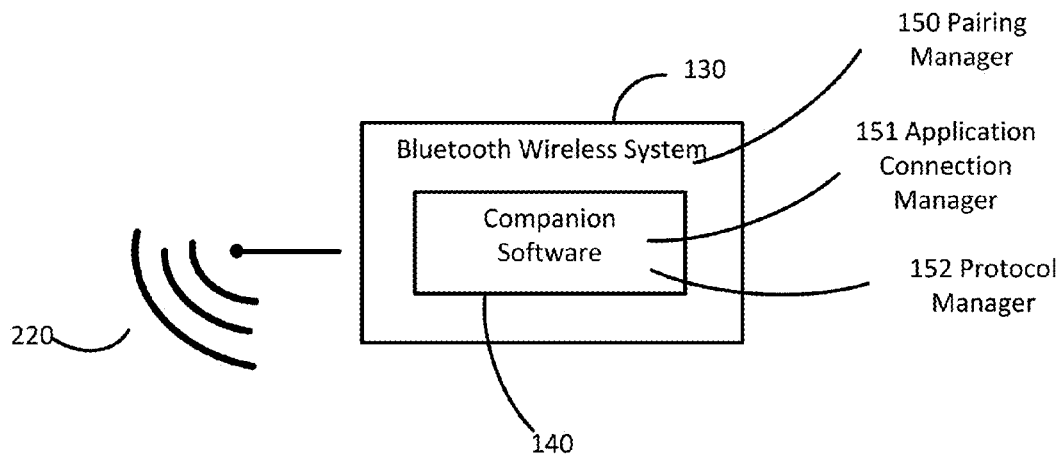
FIG. 2 is a detail view of the Bluetooth aspects shown in FIG. 1.
Figure 2:
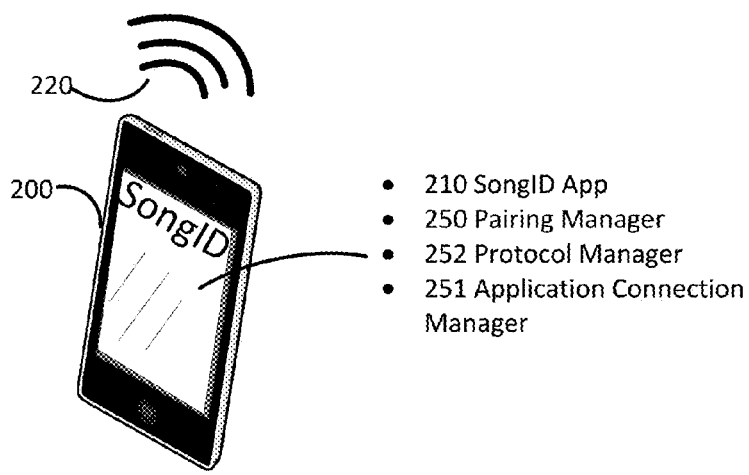

FIG. 2 is a more detailed view of the Bluetooth elements of FIG. 1 and the smart phone. As exemplified in FIG. 2, both the smart phone 200 and the radio receiver system 100 support compatible wireless technology such as Bluetooth, including the ability to pair two devices together via pairing managers 150 and 250. The pairing managers are responsible for creating the basic Bluetooth connectivity between the two devices. Since there might be several applications accessible by Bluetooth in each of the two devices, the application connection managers 151 and 251 establish application level connectivity between the companion software on the two devices and systems as exemplified by controller 100 and its subsystems, and smart phone 200 and its subsystems, especially song ID app 210. Once the applications are properly connected, the protocol managers 152 and 252 create a precise messaging system for the exchange of data between the two devices and systems such that no messages are ambiguous and each device understands the nature of messages sent and received. This is a stylized arrangement for illustrative purposes; more or fewer individual services or modules may be instantiated in any particular implementation dependent upon the designers, and the modules and services that are incorporated may be placed within other modules of the designer's choosing. For example, the pairing manager 250 may be incorporated in Bluetooth module 220, and therefore not included in song ID app 210.

Returning to FIG. 1, both devices support companion applications 140, 210 that include the ability for the smartphone song ID app 210 to request and receive the audio stream from the radio receiver 110, and optionally for the smartphone 200 to deliver artist and title data back to the controller 100 and radio receiver 110. The application level connectivity for the return of song metadata to the radio receiver optionally includes identifiers for each data element to be passed from one to the other. For example, identifiers for artist and title might use the common name|value pair concept wherein the artist name might be represented as artist="Lady Gaga". In simple terms, the radio receiver system incorporates companion software to that of the smart phone song app to enable the two systems to cooperate.

Conveniently, the Bluetooth specification includes several capabilities and profiles to enable this embodiment; these profiles include: Generic A/V Distribution Profile (GAVDP), Advanced Audio Distribution Profile (A2DP), A/V Remote Control Profile (AVRCP), as well as the A/V Control Transport protocol (AVCTP), and the A/V Distribution Transport protocol (AVDTP). Further, Bluetooth includes generic capabilities for the discovery of compatible devices, such as the Service Discovery Protocol (SDP) and the Service Discovery Application Profile (SDAP).

Figure 5:
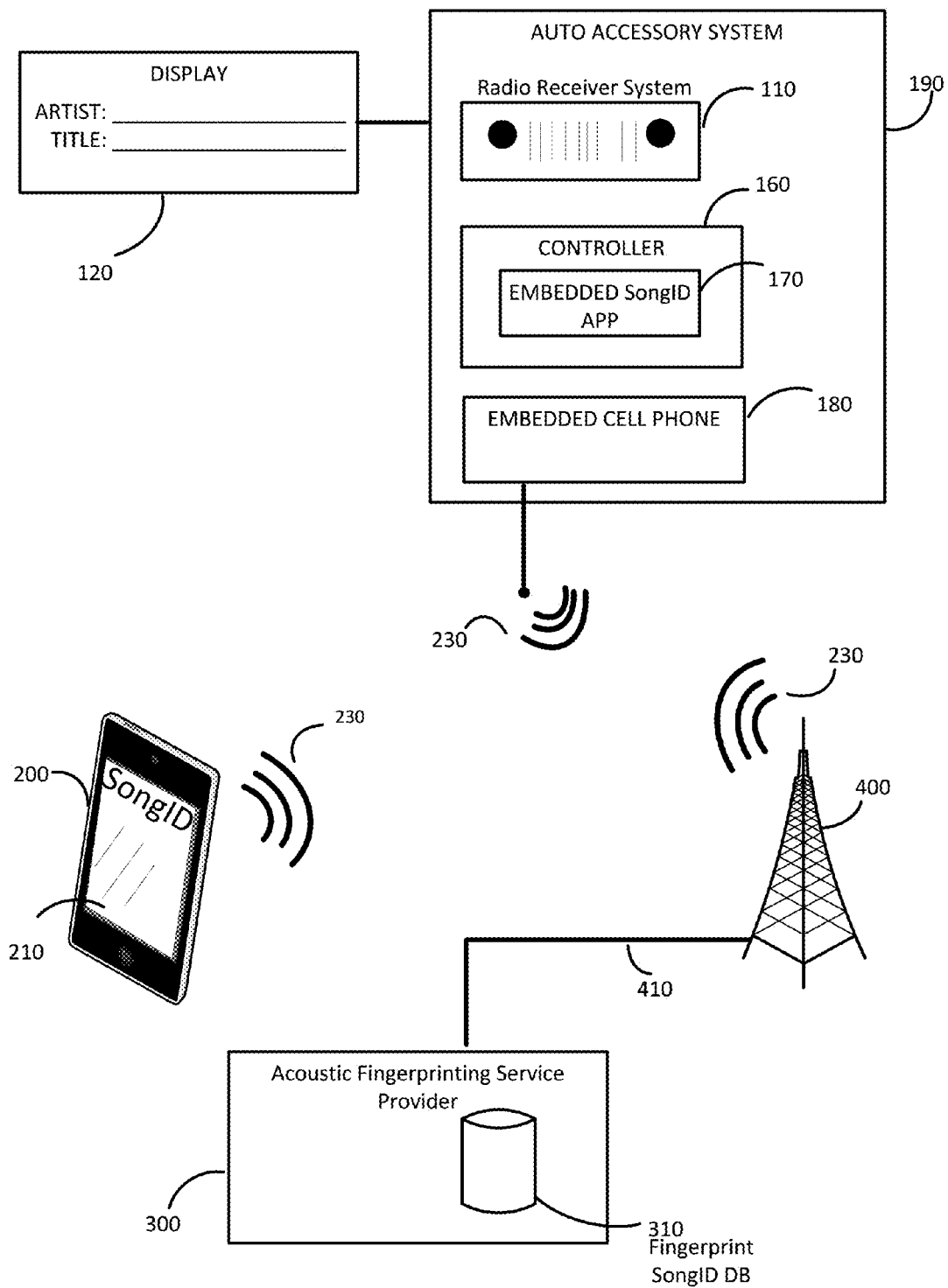
FIG. 5 is a schematic illustration of an embodiment applicable to automobile radios which incorporate an embedded cell phone.

Once communications have been established between the companion software 140 in the radio receiver system 100 and the smart phone app 210, as is further illustrated in FIG. 2 and FIG. 5, the controller 100 for the radio receiver system streams a copy of the radio's audio output through a digitizing and encoding module (not shown) if necessary. The digitized stream is then directed to the Bluetooth transceiver system 130. The digitizing and encoding module converts the audio stream from analog format to digital format such as way or mp3, or from one digital format to another. The Bluetooth transceiver system 130 transmits the continuous audio stream over the Bluetooth digital wireless system for reception by Bluetooth system 220 of the smart phone 200.

The smart phone 200 receives the continuous broadcast stream of the radio receiver's audio output through Bluetooth system 220 and delivers it to song ID app 210. In various embodiments the smart phone song ID app 210 incorporates music detection software, such as beat detection software or software of a similar algorithm. For compatibility, the app 210 may decode or transcode the audio into a format manageable by the selected beat identification software.

Using the music detection software the song ID app 210 attempts to detect the beginning of a song by a change of the beat or tempo or pitch or key or similar acoustic feature using mathematical acoustic analysis procedures, as previously described, via software algorithms incorporated into or made available to the song ID app 210.

When the presence of a new song is potentially detected, the song ID app 210 sends a snippet of the audio stream of an appropriate duration, to the acoustic fingerprinting service provider 300 for identification. If not already encoded in a necessary format, the app 210 encodes the snippet into a digital format such as mp3, as desired by the service provider 300.

The acoustic fingerprinting service provider 300 receives the incoming snippet or stream, performs an analysis of that data to create a fingerprint of it, and then looks up that fingerprint in the database 310 to find a match. If a match is found the acoustic fingerprinting service provider 300 extracts the metadata for the associated song from the database 310, and returns that metadata to the requesting smart phone song ID app 210, minimally including the title of the song, and optionally other desirable information and data such as the name of the artist, the name of the album, an image of the album cover, the purchase price of the song and of the album, support data such as SKUs to enable online purchases, song lyrics, etc. . . .

The smart phone song ID app 210 stores the information received from the acoustic fingerprinting system 300, optionally along with time of day and any other available and related data, in a user accessible format that enables the user to view the listing of songs, and optionally view additional song details such as song lyrics, view album covers, add to playlists or custom music channels, played a portion of the song as a reminder, and purchase the song or album.

The smart phone app 210 then delivers portions or all of this information via Bluetooth to the companion software 140 in the radio receiver system 100 for presentation of information about the currently playing song on display 120. Any radio receivers equipped for either RDS or HD radio would have a designated location on the display screen for the presentation of artist and title information, and so this metadata derived from an acoustic fingerprinting database could simply be inserted into those designated locations. However, display capabilities have become quite sophisticated, and so there is no real limit on what might be displayed or how it might be presented.

Figure 3:
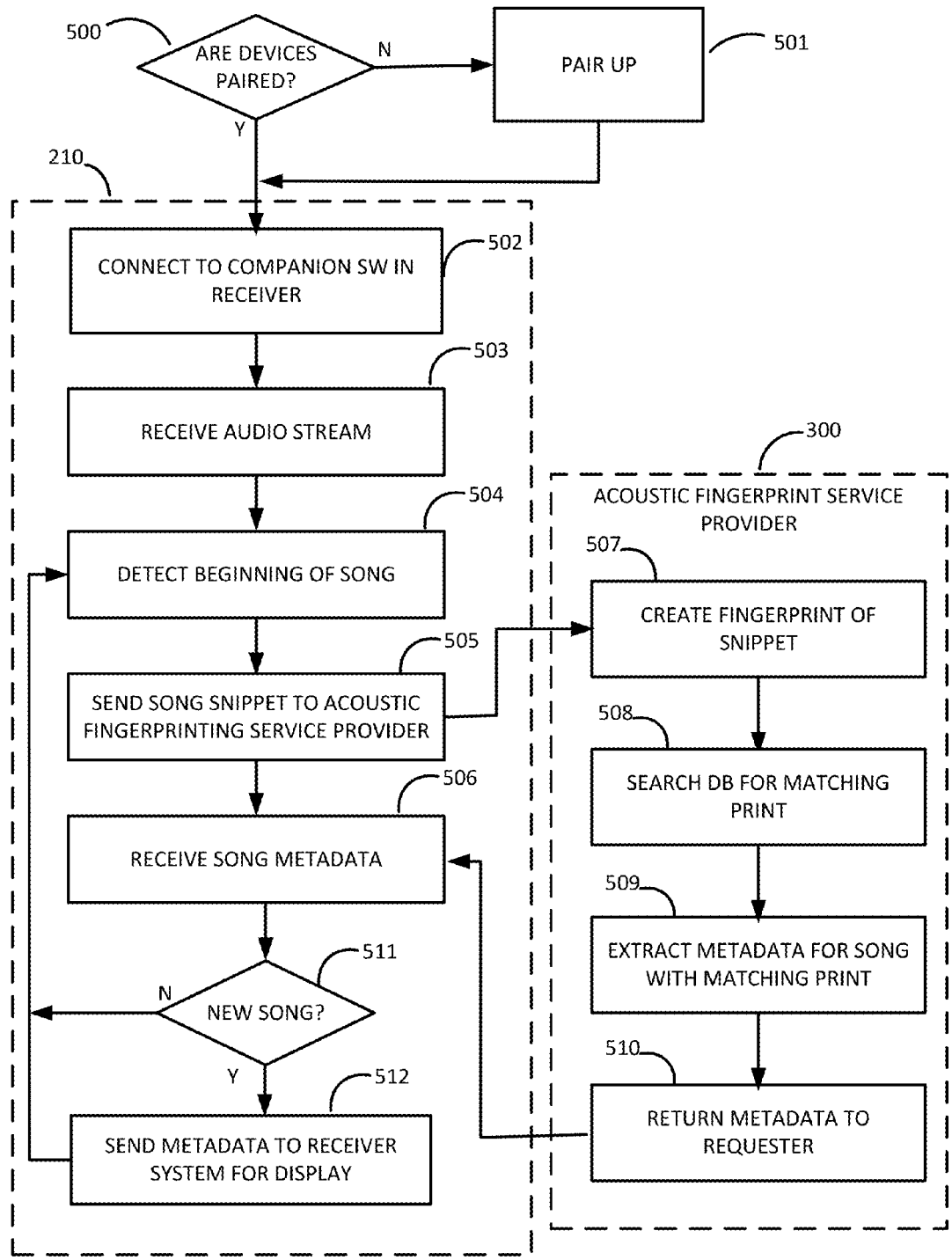
FIG. 3 is a flow chart illustrating a basic method of operation between the companion software in the radio receiver, the smart phone song ID app, and the acoustic fingerprinting service provider.

FIG. 3 is a flowchart showing this process in more detail from the standpoint of the smart phone 200. First, if the two Bluetooth devices, i.e. smart phone 200 and radio receiver 100 with Bluetooth subsystem 130, are not paired 500 then pairing takes place 501 before communications can continue. Once pairing has taken place application level connectivity is established between the companion software in each device, illustrating the smart phone app 210, at 502, which connects to companion software 140 in the radio receiver system. Once application connectivity is obtained between the two devices the radio receiver begins to send a continuous audio stream to the smart phone of the audio that is output to the speakers. Software in the smart phone listens to the continuous audio stream 503 then begins the continuous process of attempting to detect the beginning of a song 504. Whenever it detects the possible beginning of a new song, the smart phone app sends a snippet of that new song 505, comprising a portion of the beginning of the new song, to the acoustic fingerprinting service provider 300, optionally preceded by a message announcing the beginning of a new song or passing credentials. Optionally, the song ID app can send a continuous stream of the newly detected song to the acoustic fingerprinting service provider, until receiving an appropriate message from that service provider, which may be the message providing the metadata for the a new song.

The acoustic fingerprinting service provider 300 creates a fingerprint of the song snippet 507; looks for a match for that fingerprint in its database 508; and upon finding a match to the fingerprint, extracts the associated metadata for the song from the database 509 and returns that metadata to the requesting smart phone 510. The smart phone song ID app 210, as the requester, receives the song metadata 506. Then, at the step "new song?" 511, it compares the newly received song metadata with the previously received song metadata, if any, to determine if in fact there is a new song playing. If there is a new song, the song ID app 210 records the metadata elements for the new song into its own internal song information listings (not shown), and forwards some or all of the metadata elements to the radio receiver system for display 512. If the acoustic fingerprinting service provider 300 fails to detect a match, it optionally will send a failure message to the requester at step 510. If the song ID app 210 receives such a failure message, or if it determines that the song was in fact not a new song, it returns to the process of detecting the beginning of a song at step 511 by listening to the continuous stream being received from the radio receiver system. When the beginning of the next song is detected, then the process repeats of obtaining the metadata from the acoustic fingerprinting service provider 300 and delivering that metadata to the radio receiver system 100.

Figure 4:
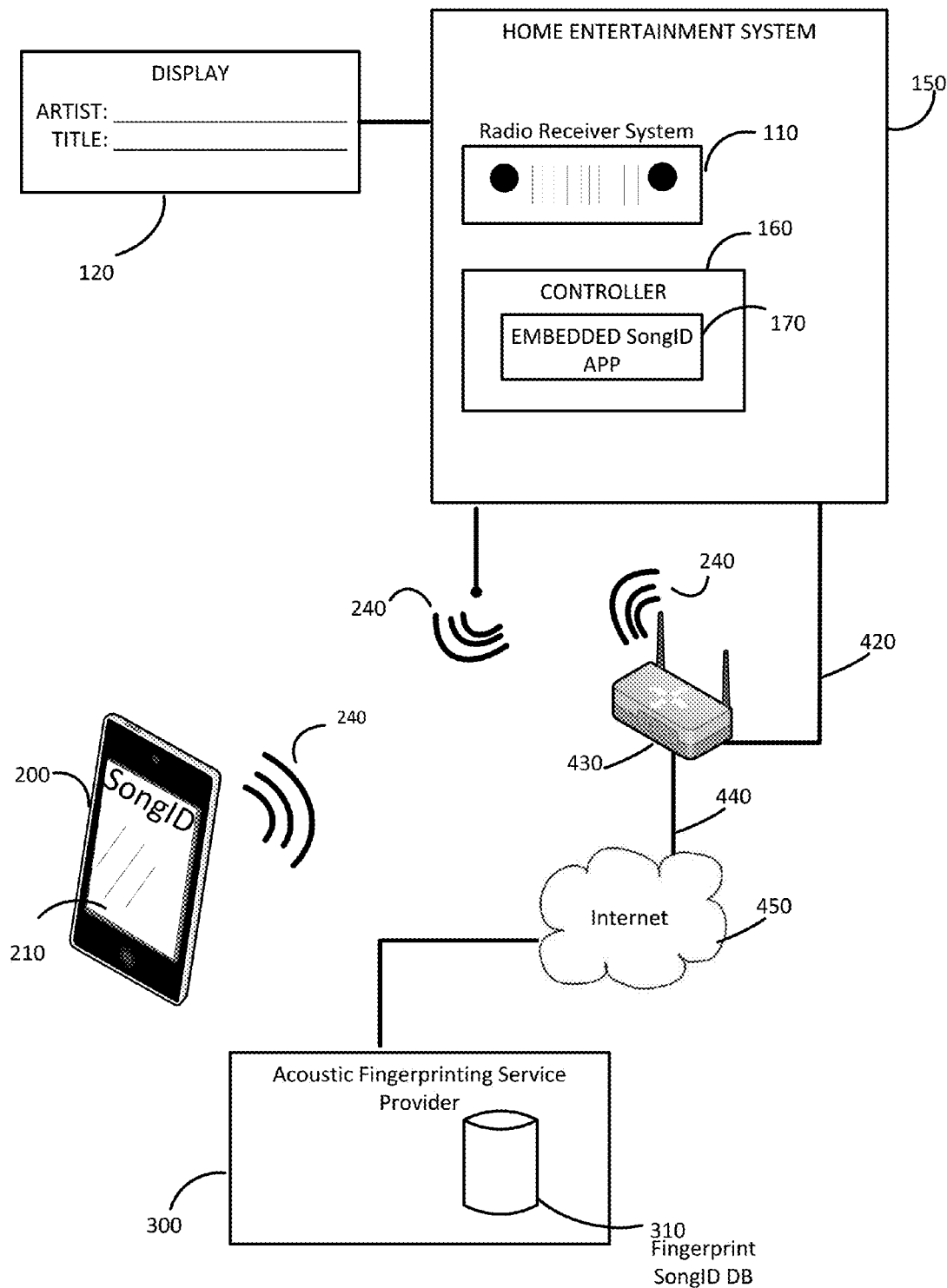
FIG. 4 is a schematic illustration of the system as it might be configured in a home stereo system or home theater system, but showing both Wi-Fi connectivity and wired Ethernet connectivity, although only one of the two connection arrangements would be necessary.

FIG. 4 is a schematic illustration of an embodiment incorporating a radio receiver 110 as it might be configured in a home stereo system or home theater system 150. In this embodiment the radio receiver system is a part of a home entertainment system, or equivalent system, that has the ability to directly access the Internet 450, either via a wired Ethernet connection 420 into a router 430 or via a Wi-Fi connection 240 into a router 430, or other arrangements that give the radio receiver system access to the Internet. For example, this arrangement might be suitable in an automobile with Wi-Fi access to the Internet. In this embodiment, the home entertainment system 150 of which the radio receiver system 110 is an integral part, incorporates a controller 160 which includes the functionality of an embedded song ID app 170.

In this embodiment, the embedded song ID app 170 incorporates some of the functionality previously described as being capabilities of the song ID app residence in the smart phone device. The controller 160 incorporates the ability to access the audio output of the radio receiver system 110 that would go to the speakers, and to encode that audio output into a continuous stream in a suitable format for Bluetooth transmission, such as way or mp3, and to deliver that continuous stream to a software module which functions as an embedded song ID app 170.

This embedded song ID app 170 incorporates software for the detection of music, and to detect the beginning of a new song. In addition, this embedded song ID app 170 possesses the capability of establishing a communication to an acoustic fingerprinting service provider 300. In operation, once the controller 160 has directed a copy of the audio stream to the embedded song ID app 170, the embedded song ID app 170 detects the beginning of a new song, and sends a portion of the beginning of the new song in a suitable encoded format to the acoustic fingerprinting service provider 300.

The acoustic fingerprinting service provider 300 accepts that snippet, prepares a fingerprint from it, searches its database 310 for a match to that fingerprint, and retrieves the associated song metadata. That metadata is then returned by the acoustic fingerprinting service provider 300 to the embedded song ID app 170. The embedded song ID app 170 presents the song metadata to the home entertainment system controller 160 which then manages the presentation of appropriate aspects of the metadata on to the system's associated display system 120. In this embodiment the embedded song ID app 160 is simply a software module that runs within the controller. Hence, in this embodiment, the embedded song app 160 and the controller 170 may be virtually indistinguishable. In this embodiment, the user achieves the immediate benefit of visual access to the songs of artist and title, and optionally other information about the current song.

The display system 120 in this embodiment may be a large screen television, that, in conjunction with user interface devices such as various types of remote controls, enables user interaction including such things as the purchasing of songs through their home entertainment system 150.

Also, a smart phone 200 and it's song ID app 210 may be associated with the home entertainment system 150 via a registration process such that the acoustic fingerprinting service provider 300 is informed that the smart phone song ID app 210 and the home entertainment system 150 and its embedded song ID app 170 operate in companionship. In this embodiment, the acoustic fingerprinting service provider 300 also provides the song metadata to the companion song ID app 210 running on the associated smart phone 200.

Consequently, the song ID app 210 of the smart phone 200 contains a listing of all songs that have been identified through the radio receiver system 150 in this fashion, which enables the user to investigate their musical interests via their smart phone 200 and song ID app 210 as described previously, including the purchase of any song or album in that listing. Since the smart phone 200 is a portable device, the user, who had been the listener of a stationary system, can review the song listing information and can engage with the song ID app 210 service provider at any time and at any place to participate in the interactive process to explore their musical interests, purchase songs of their likings, create lists of favorites, share that list with others, create custom musical channels, and in other ways to enhance their musical experience.

FIG. 5 describes an embodiment conceptually similar to that of FIG. 4 in many respects, but with the key difference that the radio receiver system 110 is part of an overarching system such as may be found in an automobile where in the radio receiver system 110 is a part of a computerized auto accessory system 190, such as General Motor's OnStar system, which incorporates an embedded cell phone 180. In this arrangement the embedded song ID app 170 of the auto accessory system 190, radio receiver system 110, and internal controller 160, communicates with the acoustic fingerprinting service provider 300 via the embedded cell phone technology 180, and the acoustic fingerprinting service provider 300 also optionally communicates with the user's smart phone 200 and its song ID app 210 by conventional cell phone wireless technology 230.

As just described, radio listeners are now enabled to be informed of song information such as artist and title in real time on a display associated with radio receiver 110, whether or not the radio broadcaster transmits that information, and furthermore the radio listeners are enabled to have a listing on their smart phone of all songs that have been identified in this fashion, and enables the user to investigate their musical interests as described previously, including the purchase of any song or album in that listing.

The users therefore benefit both from the ability to be informed in real time about songs as they are playing, as well as from the ability then and at future times to engage in the exploration of that music via the playlists stored on their smart phone. Since the smart phone is portable, the user, who may have been listening while otherwise disposed, such as while driving, can review the song listing information and can engage with the song ID app 210 and that app's service provider at any time and at any place to participate in the interactive process to explore their musical interests, purchase songs of their likings, create lists of favorites, share that list with others, create custom musical channels, and in other ways to enhance their musical experience.

The disclosures herein that refer to smart phones should be understood to equally refer to cell phones, tablets, and similar wireless devices in general. The term "smart phone application", or "app", should be understood to mean software prepared in machine readable form to run within the operating system and on the hardware of a respective smart phone device, and that terms such as "song listings" refer to the recording and storage of song metadata by the application onto non-transient media of the smart phone such as non-volatile RAM.

Beneficially, the disclosures and embodiments described enables the song ID app provider the opportunity to offer for sale every song heard by the listener, even though it may have been heard from a music source that also offers the song for sale.

Smart Phone Listens to Itself Embodiments

The following embodiments as illustrated in FIG. 6 through FIG. 10, disclose the attainment of music artist and title information, as well as other information related to the currently playing song, for music played through a smart phone from any of a variety of sources, independently of whether or not that information is transmitted by the broadcaster.

This embodiment is a method and a system for a smart phone application, or an inherent capability of the smart phone itself such as by a feature of the smart phone operating system or electronic design, to electronically and internally monitor the audio output of the smart phone. In the occasion wherein that audio output derives a musical source (to exclude, for example, audio portions associated with voice calls) such as a broadcast radio station simulcasting on the Internet, or an Internet-only radio station, determine when that audio output constitutes music. When the presence of music is detected, then identify the song and its associated artist and title, optionally along with other associated song metadata, from an acoustic fingerprinting service provider on the Internet, and store that artist and title information for the user for subsequent engagement and pursuit of their musical interests. In this fashion, this embodiment provides the ability to identify every song heard by the user through their smart phone, regardless of the source of that music, and to keep a listing of those songs within the app or accessible from the app, for all the purposes a user might desire.

Figure 6:
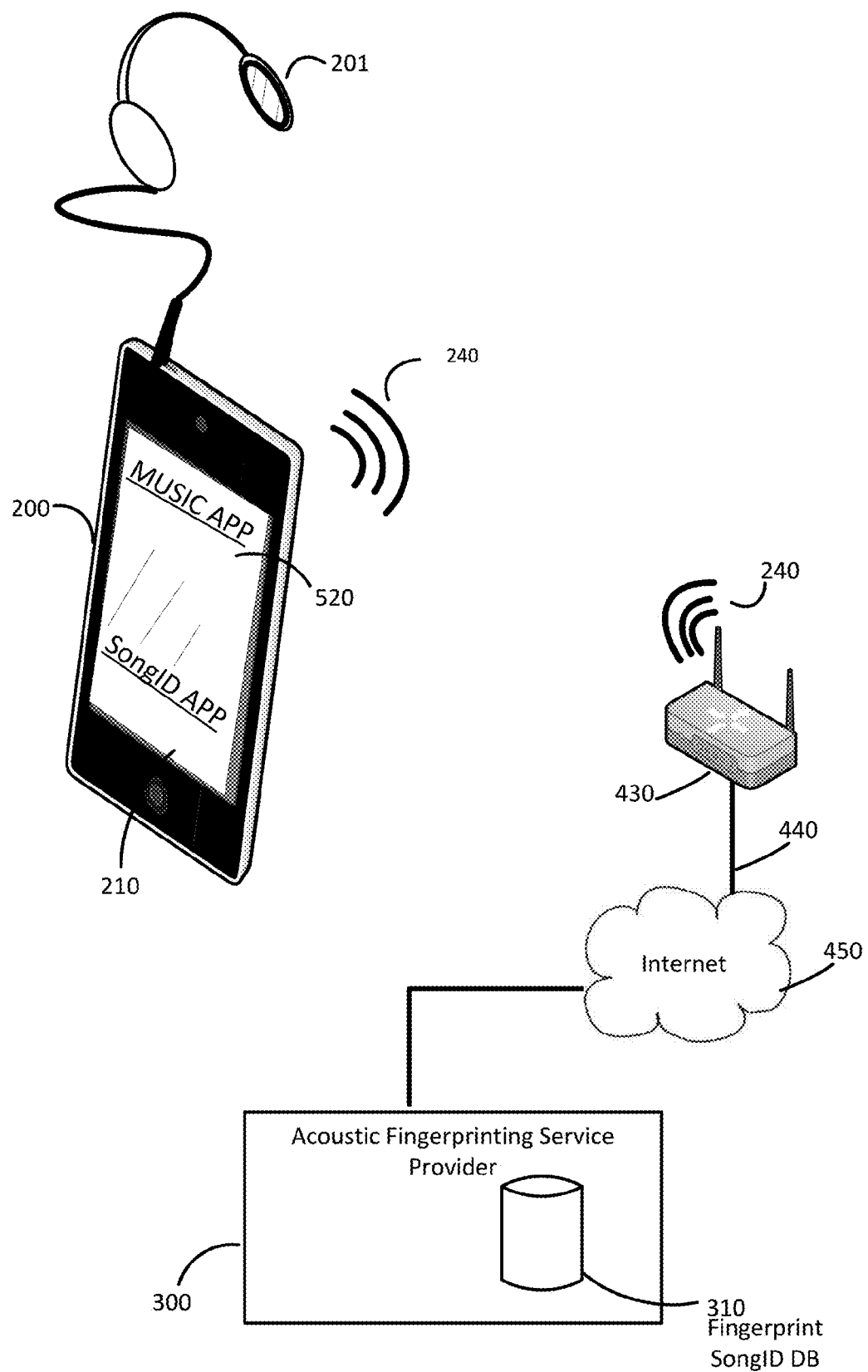
FIG. 6 is a schematic illustration of an embodiment in which the song ID app communicates to the acoustic fingerprinting service provider via a wireless Wi-Fi connection to a local router which then passes information across the Internet.

FIG. 6 is a schematic illustration of an embodiment in which a music app 520 is playing music on the smart phone 200 through headphones 201, the music being accessed from any one of a wide variety of potential sources on the Internet or elsewhere, and wherein the song ID app 210 is enabled to access a copy of the audio stream. Other than accessing music from an Internet source, music app 520 might be playing songs stored internally in smart phone 200, or playing songs from an associated PC accessed via Wi-Fi or Bluetooth, or accessed from another smart phone on a Bluetooth piconet, or from a radio receiver as disclosed herein, or accessed from potentially other sources.

Figure 9:
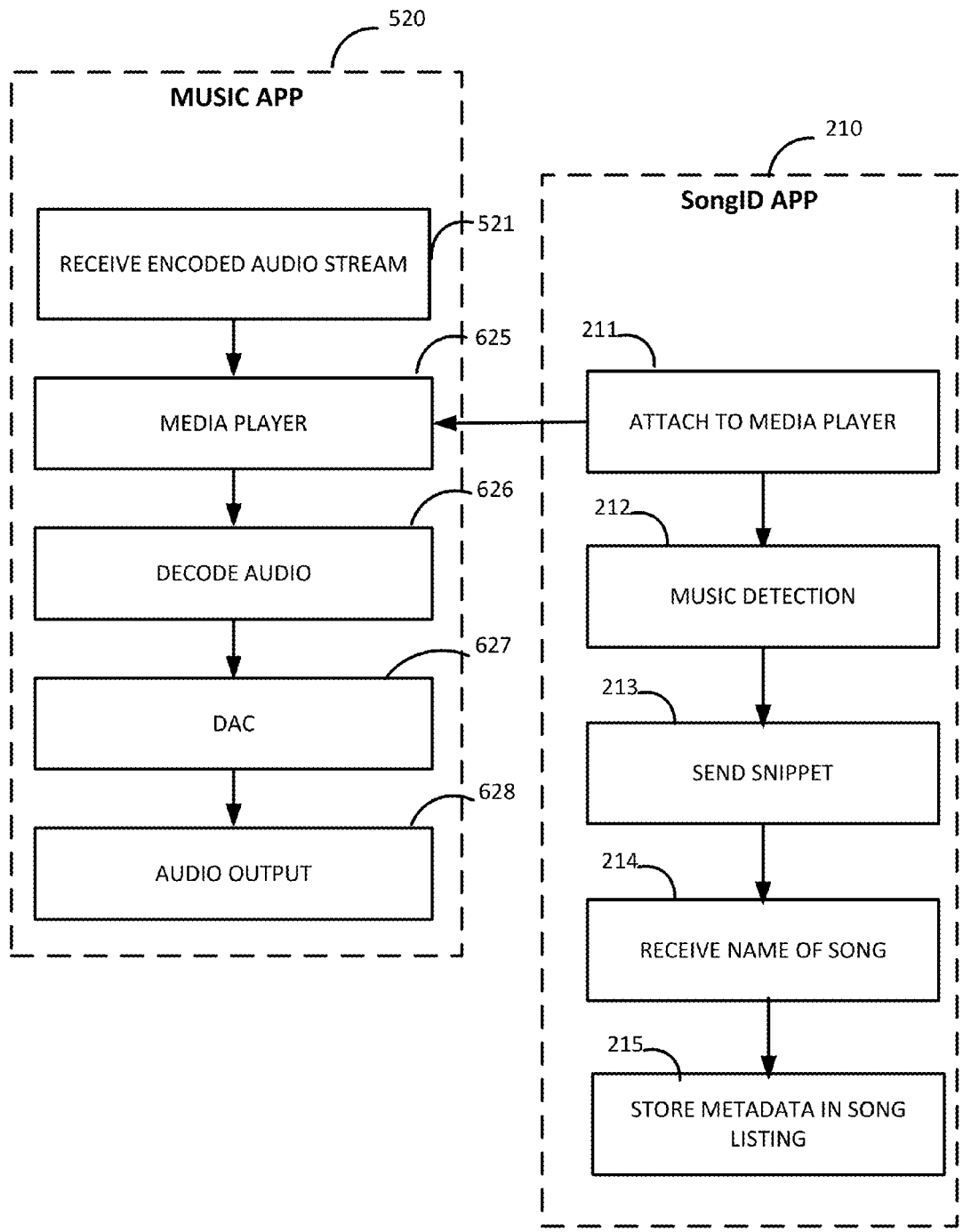
FIG. 9 is a schematic illustration of the relationship between a music app running in the smart phone and the song ID app.

In this embodiment, the song ID app 210 accesses a copy of the audio stream being played by a music app 520 (see 211 in FIG. 9). The smart phone song ID app 210 incorporates music detection software (see 212 in FIG. 9), such as beat detection software. Using the music detection software the song ID app 210 analyzes the audio stream to detect the presence of music and the beginning of a song using music detection schemes as previously described. When the presence of a new song is potentially detected, such as by a change of the beat or tempo or pitch or key, the song ID app 210 selects a snippet or portion of the audio stream and sends it to the acoustic fingerprinting service provider 300 for identification, optionally associated with or preceded by a message to the acoustic fingerprinting service provider announcing the beginning of a new song, and optionally providing song ID app 210 license or serial number, song ID app provider information, or user ID information for access permissions, accounting purposes, and similar reasons. Optionally, the song ID app 210 may send a continuous stream of the newly detected song to the acoustic fingerprinting service provider 300 until notified by that service provider directly or indirectly to terminate the transmission of that stream, such as by a reply message delivering the artist and title information.

The acoustic fingerprinting service provider 300 is located on the Internet 450 and is accessible via data packets sent from the smart phone, and can communicate similarly in the reverse direction. The song ID app 210 will typically use the same wireless access technology to access Internet resources as is used by the music app 520. In the embodiment shown by this drawing, the song ID app 210 uses Wi-Fi connectivity 240 to access a local router 430, and via broadband connection 440 from router 430 to access the Internet 450, and then the acoustic fingerprinting service provider 300.

The acoustic fingerprinting service provider 300 maintains a database 310 that cross-references fingerprints of songs to metadata about the songs, especially including the artist and title of the song, and minimally including the title of the song. The acoustic fingerprinting service provider 300 receives the incoming snippet or stream, performs an analysis of that data to create a fingerprint, and then looks up that fingerprint in the database to find a match. If a match is found the acoustic fingerprinting service provider 300 extracts the metadata for the associated song from the database, minimally including the title of the song, and returns that metadata to the requester, that is, song ID app 210 running in smart phone 200.

The smart phone song ID app 210 stores the information received from the acoustic fingerprinting system 300, optionally along with time of day and any other available and related data, in a user accessible format that enables the user to view the listing of songs, and optionally view additional song details such as song lyrics and album covers, add to playlists or custom music channels, play a portion of the song as a reminder, and purchase the song or album.

Figure 7:
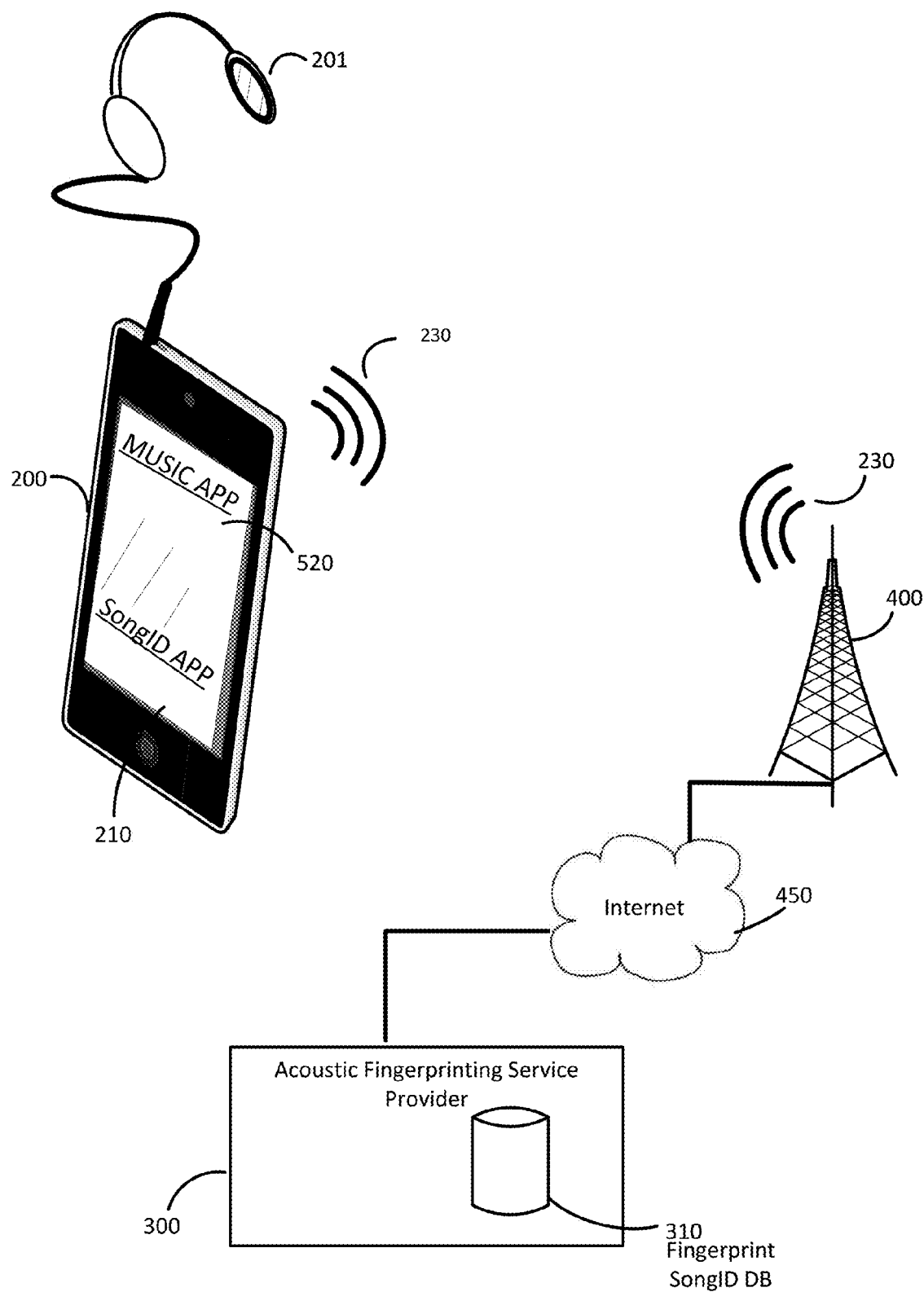
FIG. 7 is an alternate version of that shown in FIG. 6, in which the wireless access from the smart phone is via cell phone wireless.

FIG. 7 is a schematic illustration of a similar embodiment as described in FIG. 6, with the difference that the wireless transmission access method between the smart phone 200 and the Internet 450 is via the cell phone service provider's cellular technology 230, rather than Wi-Fi. In this arrangement the smart phone 200 connects by conventional cell phone wireless transmission 230 to a cell phone tower 400. In the current common cell phone wireless network design, a cell phone tower 400 connects via a network gateway system provided by the wireless service provider (not shown), which connects the wireless service provider's network to the worldwide Internet backbone system 450.

Figure 8:
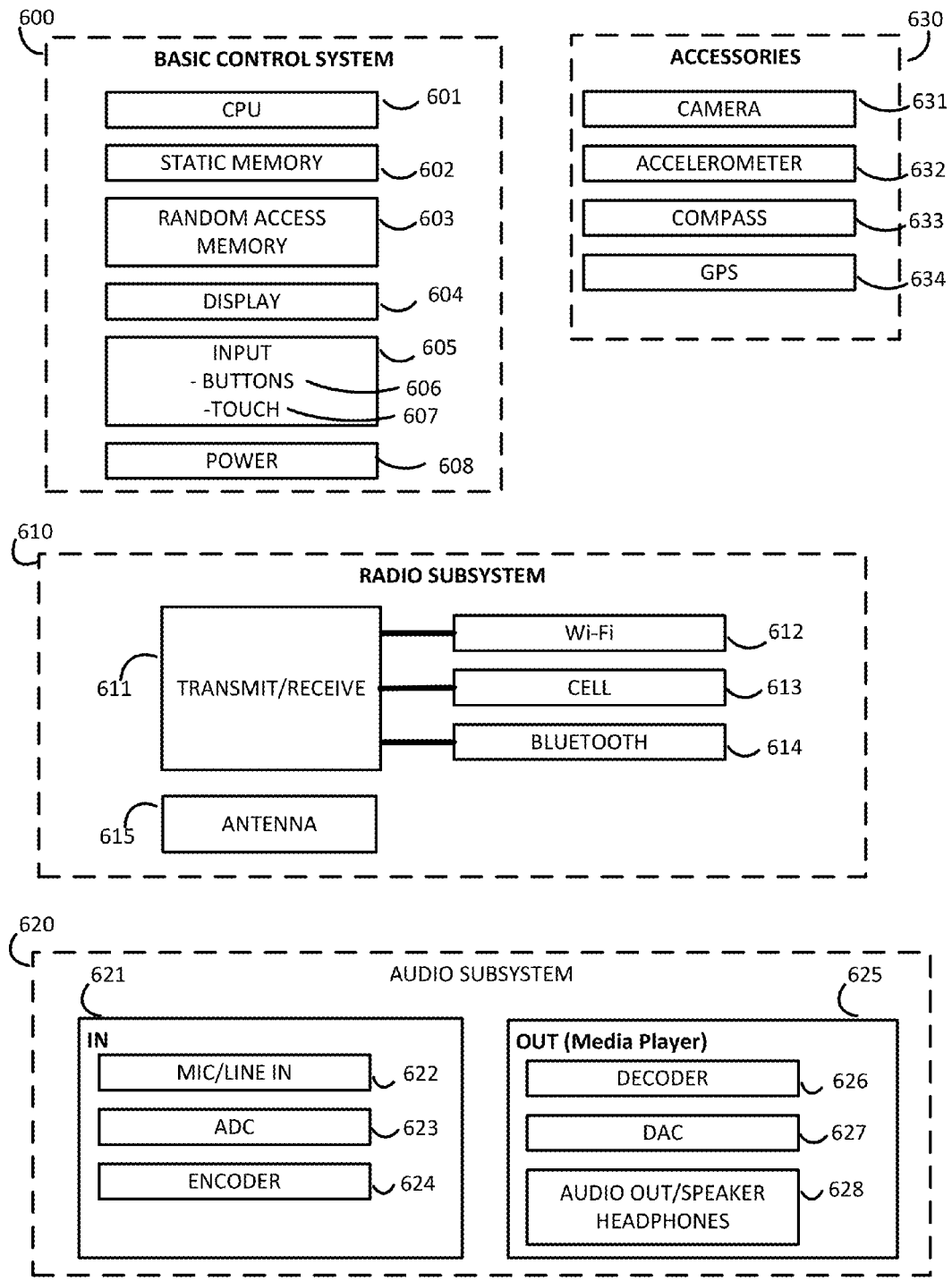
FIG. 8 is a diagram outlining the basic components and systems of a smart phone.

FIG. 8 is a diagram showing the major logical components of a smart phone. It comprises a basic control system 600 which includes a CPU 601, static memory 602 in which is stored the operating system and application data, random access memory 603 for the execution of the code stored in static memory 602, the display system 604, the system input mechanisms 605 including buttons 606 and the touchscreen 607, and the power system 608. Obviously this is a high level system diagram for illustrative purposes only, provided to aid the discussion related to embodiments being described, and is not intended to be definitive in any way. Smart phone 200 further comprises a radio subsystem 610 which incorporates transmit and receive mechanisms 611 for basic cell phone communications 613, Wi-Fi 612, and Bluetooth 614, which are connected to one or more antennae 615. Smart phone 200 further comprises an audio subsystem 620 which includes in 621 and out 625 portions. The "in" portion 621 includes a microphone and/or line-in portion 622, an analog to digital converter (ADC) portion 623, and an encoder function 624 that can encode the digital signal from the ADC 623 into an appropriate format such as mp3. The "out" portion 625, which is, in effect, the media player of the device, comprises a decoder function 626 to convert formatted audio from a format such as mp3 into an unencoded bit stream such as the way or CPM format, a digital to analog converter (DAC) 627 which converts the unencoded bit stream into a varying analog voltage, and the audio out portion 628 which includes the speaker and headphone outputs. Modern systems typically further comprise a set of accessory functions 630 which commonly include a camera 631, an accelerometer 632, a compass 633, and a GPS system 634.

FIG. 9 is a schematic illustration of the relationship between a music app 520 running in the smart phone 200 and the song ID app 210. The music app 520 comprises a function which receives an encoded audio stream 521, typically received wirelessly from an Internet source, and delivers the audio stream to the media player subsystem 625 of the smart phone which will decode the audio into a bit stream 626, convert it to an analog voltage by DAC 627, and output the audio it to the speakers or headphones 628. It should be understood that the smart phone 200 is a software enabled hardware device. The description just provided is loosely intended to describe software functions that operate as routines or modules which ultimately interface with physical hardware and electronic systems, and that it would take volumes to adequately describe such a system. The song ID app 210 is configured to attach itself by a software mechanism 211 into a system resource which can make that audio stream available, such as the media player subsystem 625. The audio stream, under control of song ID app 210, is then operated upon by music detection module 212, to determine the presence of music, and preferably the beginning of a song. Song ID app 210 then sends a snippet 213 of that audio stream to the acoustic fingerprinting service provider 300. Acoustic fingerprinting service provider 300 returns the name of the song 214, optionally with other metadata. And song ID app 300 records the name of the song 214 and other metadata into its local storage for listing and presentation to the user.

There may be multiple ways in which the song ID app 210 may be configured to tap into the audio stream of a cell phone, illustrated as 211, the particular methodology being determined by the hardware design of that cell phone, or by the particulars of the resident operating system and its audio subsystem. Presently, each major vendor of smart phone operating systems makes available a Software Development Kit (SDK) which enables independent software and application developers to create apps that access the native low-level software and hardware of the system. The process is different for each such vendor, although the end results in terms of a finished app are approximately the same. Further, the vendors and designers of smart phones are enabled themselves to implement the capabilities taught in this invention, rather than just third party and independent developers. Therefore the implementation as herein described should be considered illustrative in that any of a variety of arrangements may be comparable and suitable.

Figure 10:
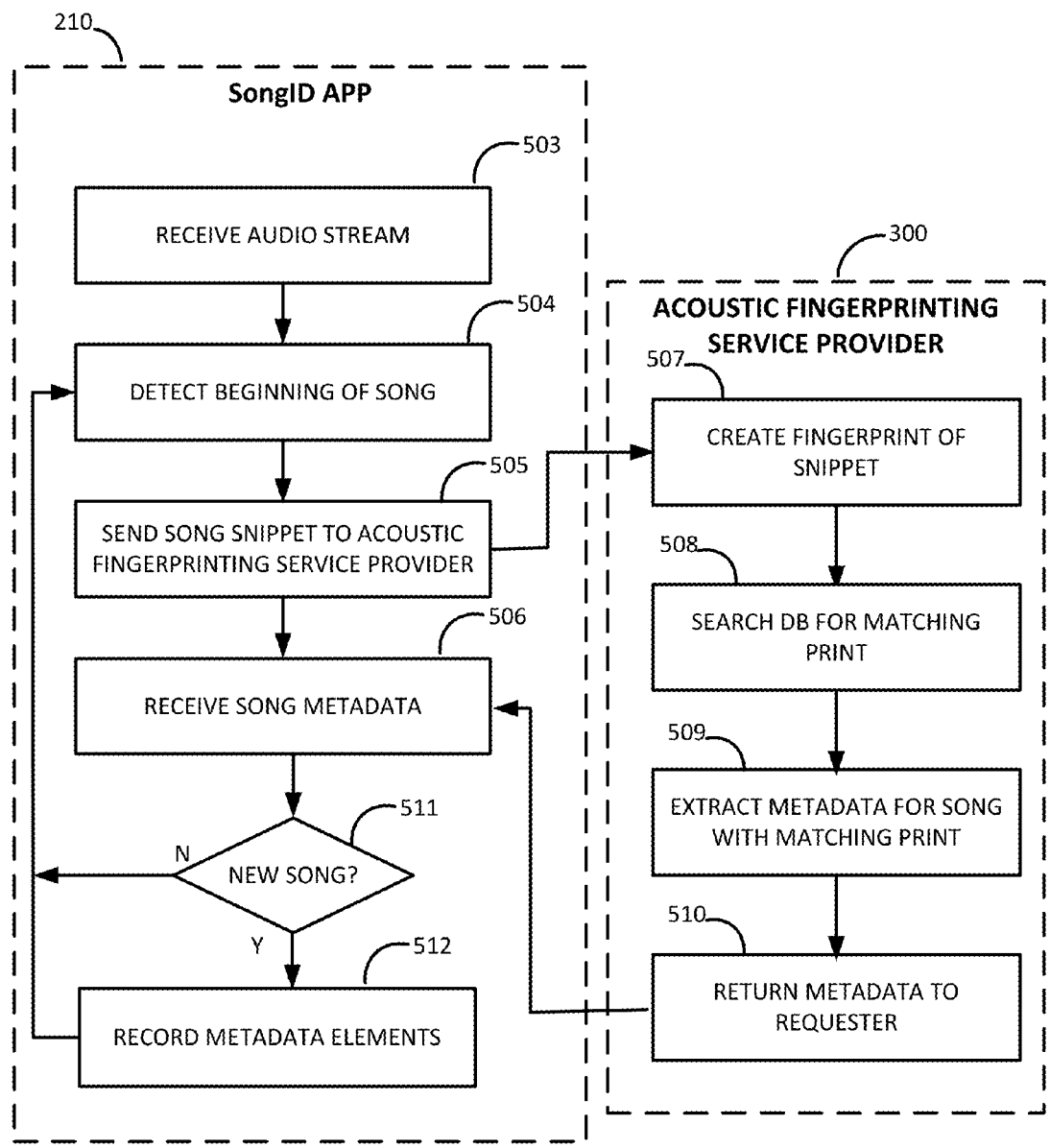
FIG. 10 is a flowchart detailing the process by which a song ID app detects a song, passes that information to an acoustic fingerprinting service provider, and retrieves the song metadata from that service provider.

FIG. 10 is a flowchart detailing the process by which a song ID app 210 detects a song, passes that information to an acoustic fingerprinting service provider 300, and retrieves the song metadata from that service provider. When a music app 520 (not shown in FIG. 10) begins delivering an audio stream, and the media player subsystem is active, the song ID app 210 is configured to receive a copy of the audio stream 503. It then begins the continuous process of attempting to detect the beginning of a song 504. When it detects the possible beginning of a song it sends a snippet of that song 505 to the acoustic fingerprinting service provider 300 located on the Internet. Optionally, the song ID app can send a continuous stream of the newly detected song to the acoustic fingerprinting service provider, until receiving an appropriate message from that service provider, which may be the message providing the metadata for the a new song.

The acoustic fingerprinting service provider 300 then creates a fingerprint of that snippet 507, searches their database for matching print 508, extracts the metadata for a song with the matching fingerprint 509, and returns that metadata to the requester 510. The song ID app 210, as the requester, receives the song metadata at 506 from the acoustic fingerprinting service provider 300. It then, at the step "new song?" 511, compares the newly received song metadata with the previously received song metadata, if any, to determine if, in fact, there is a new song playing. If there is a new song, the song ID app records the metadata elements for the new song into its listing 512. If the acoustic fingerprinting service provider fails to detect a match, it optionally will send a failure message to the requester. If the song ID app 210 receives such a failure message, or if it determines that the song was in fact not a new song, it returns to the process of detecting the beginning of a song at 504. When the beginning of the next song is detected, then the process repeats of obtaining the metadata from the acoustic fingerprinting service provider and delivering that metadata to the radio receiver system.

Smart Phone Listens to Ambient Audio Embodiments

Figure 11:
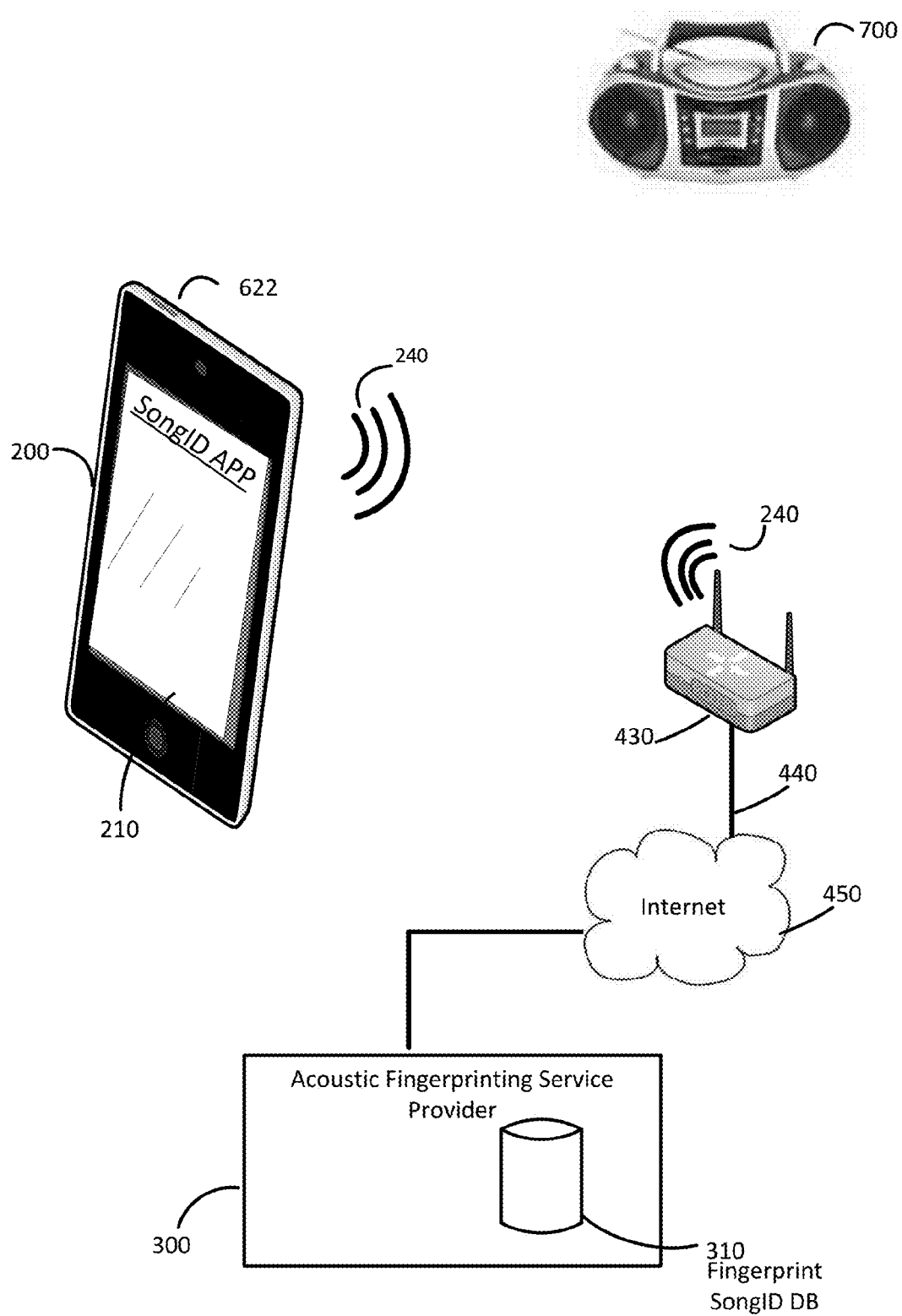
FIG. 11 is a schematic illustration of an embodiment in which the song ID app listens to an ambient audio source, and communicates to the acoustic fingerprinting service provider via a wireless Wi-Fi connection to a local router which then passes information across the Internet.
Figure 12:
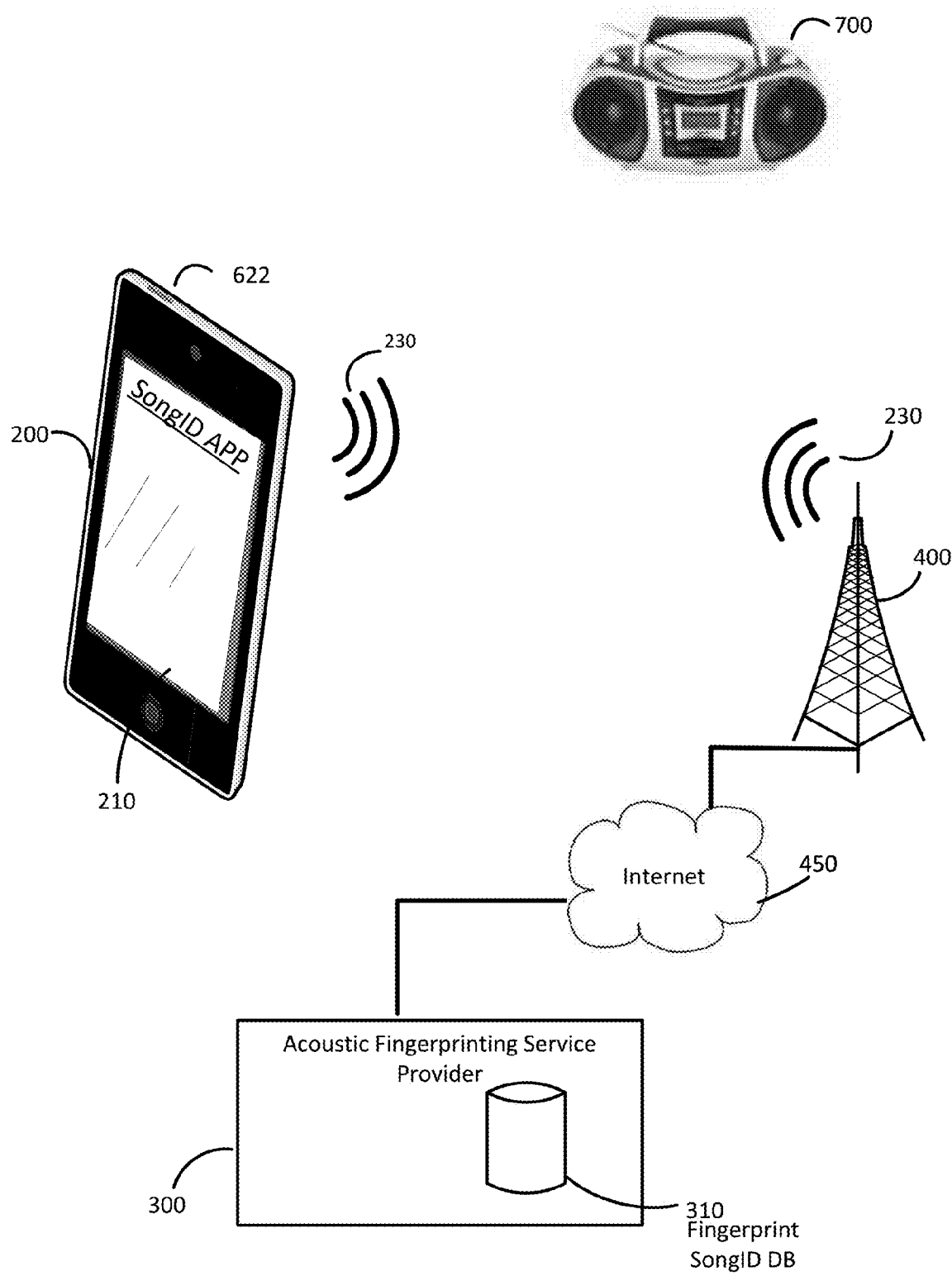
FIG. 12 is an alternate version of that shown in FIG. 11, in which the wireless access from the smart phone is via cell phone wireless.

The following embodiments as illustrated in FIG. 11 and FIG. 12 enable the attainment of music artist and title information, as well as other available information related to the currently playing song, for ambient music audible to a smart phone from any of a variety of sources such as radio receivers, televisions, or background music in stores and offices, independently of whether or not that information is transmitted by the broadcaster. These embodiments have both methods and systems to achieve this purpose.

FIG. 11 is a schematic illustration of an embodiment in which a song ID app 210 is provisioned to listen to ambient audio, illustrated as originating from a portable radio 700, via the smart phone's microphone 622. Operationally, this embodiment is the same as that described for FIGS. 6-10 except that in this embodiment, the song ID app 210 is configured to attach itself by a software mechanism into a system resource which can make the audio stream from the microphone available, such as the audio input subsystem 620 FIG. 8.

Song ID app 210 accesses the audio stream from the microphone 622 and analyzes that stream to detect the presence of music and the beginning of a song using music detection schemes as previously described. The process is the same as that described for FIG. 10, except that in this embodiment, element 503 for receiving the audio stream originates from the smart phone microphone 622. Then, continuing with FIG. 10 as detailed above, when the presence of a new song is potentially detected, such as by a change of the beat or tempo or pitch or key, the song ID app selects a snippet of the audio stream, comprising a portion of that audio stream, and sends it to the acoustic fingerprinting service provider for identification, optionally associated with or preceded by a message to the acoustic fingerprinting service provider announcing the beginning of a new song, and optionally providing user ID information. Optionally, the song ID app may send a continuous stream of the newly detected song to the acoustic fingerprinting service provider until notified by that service provider directly or indirectly to terminate the transmission of that stream, such as by a reply message delivering the artist and title information.

FIG. 12 is a schematic illustration of the embodiment as described in FIG. 11, with the difference that the wireless transmission access method between the smart phone and the Internet is via the cell phone service provider's cellular technology 230, rather than Wi-Fi (item 240 FIG. 11). In this arrangement the smart phone connects by conventional cell phone wireless transmission 230 to a cell phone tower 400. In the current common cell phone wireless network design, a cell phone tower connects via a network gateway system provided by the wireless service provider (not shown), which connects the wireless service provider's network 410 to the worldwide Internet backbone system 450.

Radio Station Auditing Embodiments

Figure 13:
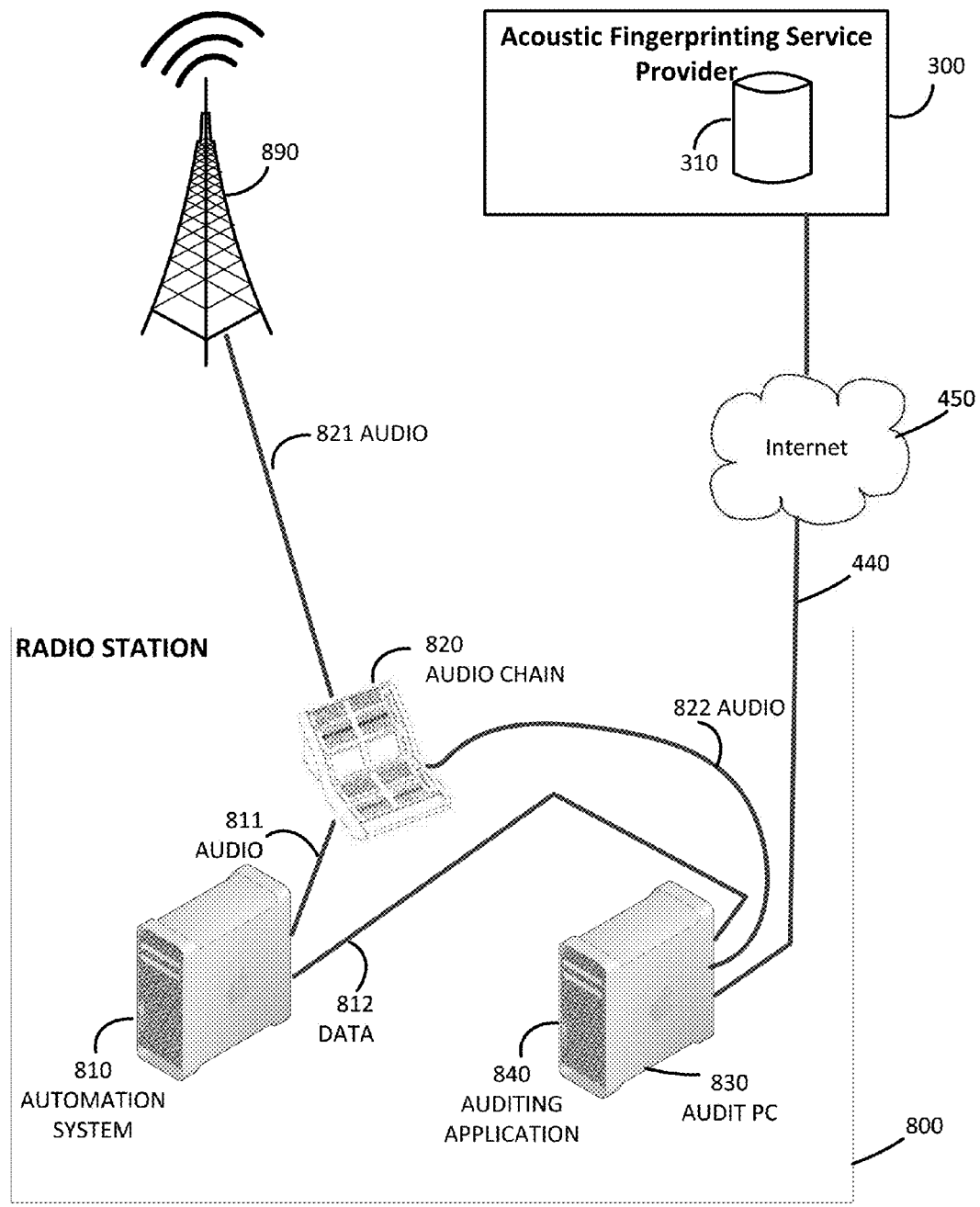
FIG. 13 is a schematic drawing illustrating an embodiment that is an improved method and system for auditing radio stations and other broadcasters.

FIG. 13 is a schematic drawing illustrating an embodiment that is an improved method and system for auditing radio stations and other broadcasters such as television stations, television networks, and cable television networks. In this embodiment, a "desktop" or PC auditing application 840 running in a PC or server 830 at the broadcast station 800 (or other convenient location) receives the station's audio output that will be transmitted over the air. For most stations, the audio for songs and commercials is stored in digital format in a broadcast automation system 810, which plays out that audio content 811 according to a schedule or under the direction of a DJ. The audio from the automation system 810 typically is routed to an "audio chain" 820 that enhances the audio and delivers it 821 to the radio transmission system 890. In this embodiment, an audio output with the identical content as 821 is delivered 822 to PC 830.

In one mode of operation of this embodiment, application 840 digitizes audio stream 822 if it is not already in an appropriate digital format, and transmits a continuous stream of the digitized audio via broadband connection 440, through the Internet 450 to an acoustic fingerprinting service provider 300. The acoustic fingerprinting service provider 300 maintains a fingerprinting database 310 of songs, commercials, and any other content of interest.

The acoustic fingerprinting service provider 300 has DSP-based software to analyze the incoming audio stream 822 from a radio station 800 to detect changes in the nature of the audio content, such as detecting the beginning of a song, detecting a change from one song to another, or from a song to DJ chatter, from DJ chatter to a commercial, or from one commercial to another, and thus parsing the audio content into identifiable segments of audio content elements. A fingerprint is created for each such segment, and is compared against fingerprints of audio content stored in the fingerprint song database 310. When a fingerprint thus created matches a fingerprint in the database 310, a record is made in an accounting system (not shown) of the name or ID of the song, commercial, or other content. Reports are produced from analysis of the accounting system regarding the names, frequencies, times-of-day, etc. that the various contents of interest are played. The accounting system may be incorporated into the fingerprint song database system 310.

In an optional mode of operation of this embodiment, software in the PC application 840, running in PC 830 and receiving the audio input 822 has DSP-based software to analyze the incoming audio stream 822 and detect changes in the nature of the audio content, such as detecting the beginning of a song, detecting the change from one song to another, from a song to DJ chatter, from DJ chatter to a commercial, or from one commercial to another. As such audio content segments are detected, DSP-based software of application 840 creates a fingerprint of identifiable segments of the audio content. Fingerprints are then transmitted by application 840 via broadband connection 440, through the Internet 450 to acoustic fingerprinting service provider 300. Acoustic fingerprinting service provider 300 receives the fingerprints and looks them up in fingerprint song database 310 for a match. As matches are found the acoustic fingerprinting service provider records that information in an accounting system for the creation of reports, as stated above.

Optionally, auditing application 840 may be resident within the broadcast automation system computer 810, or may be a software module of the broadcast automation system.

Optionally, the broadcaster may be a television station, TV network, or cable TV network. For these embodiments, automation system 810 may be any equivalent system suitable to television broadcasts, audio 811 may be video with accompanying audio, audio chain 820 may represent the video output chain, and audio output 822 may encompass combined audio and video. In these embodiments, auditing application 840 may incorporate software to access the audio content of a combined audio/video stream to perform the functions described.

Optionally, the broadcast automation system may 810 may provide a metadata output 812 to audit PC 830 and auditing application 840, comprising the names or IDs or related information of songs, commercials, and other audio content of interest as it is broadcast. Auditing application 840 may then incorporate that metadata with the audio stream or fingerprints that it provides to acoustic fingerprinting service provider 300. As a further option, broadcast automation system 810 may transmit the metadata output directly to the acoustic fingerprinting service provider 300 via the Internet 450.

Figure 14:
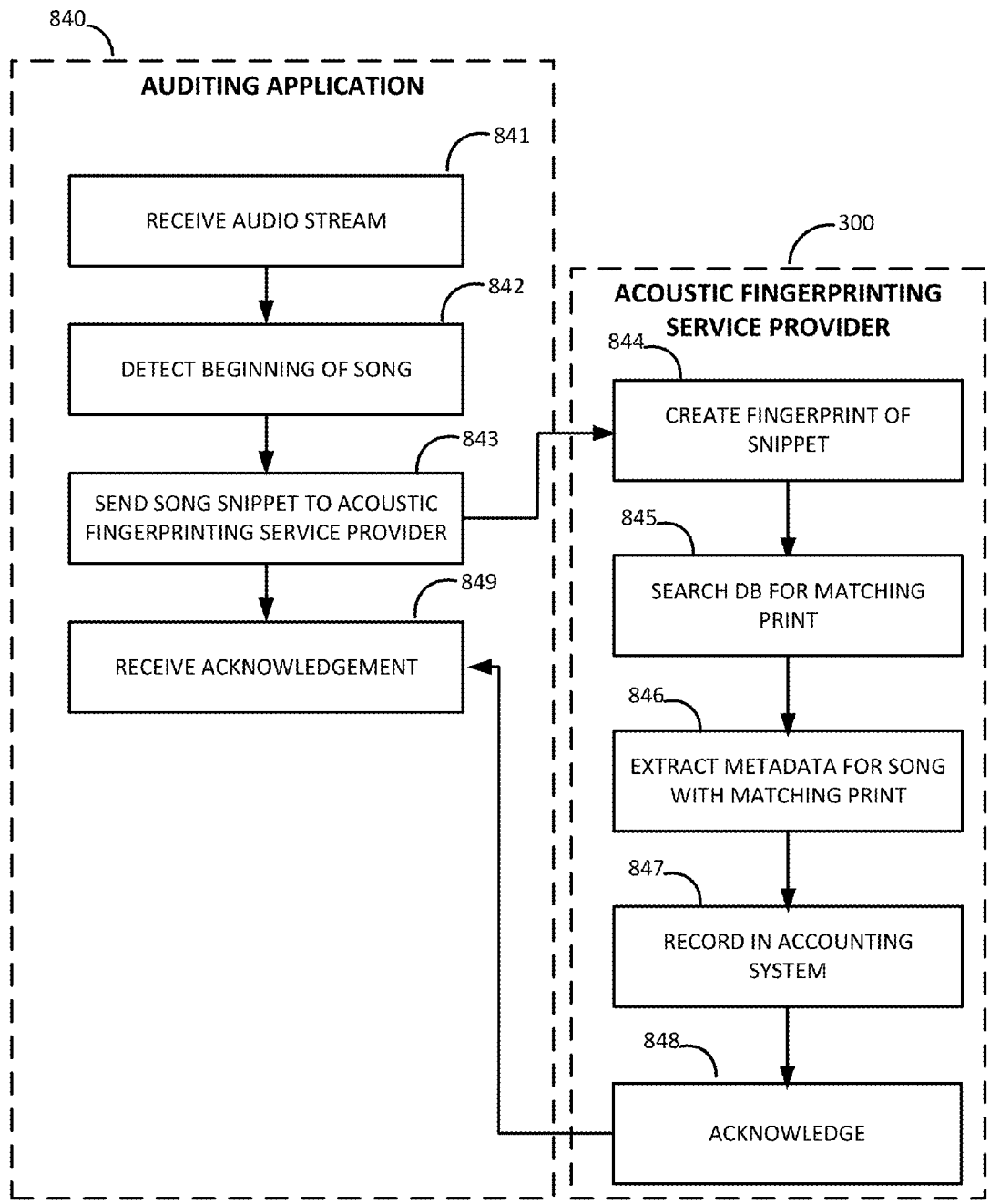
FIG. 14 is a flow chart illustrating one embodiment of an auditing system.

FIG. 14 is a flow chart illustrating one embodiment of an auditing system herein described. Auditing application 840 receives an audio stream 841. Music detection software detects the beginning of a song 842. When a song is detected, auditing application 840 sends a snippet of the song to the acoustic fingerprinting service provider 300 at step 843. Acoustic fingerprinting service provider 300 receives the song snippet and creates a fingerprint of the snippet at step 844, then searches the fingerprint song database at 845 for a matching print. If a match is found, the metadata for the song associated with the fingerprint is extracted 846, and information associated with the station and that song is recorded in an accounting system for reporting 847. Acoustic fingerprinting service provider 300 then acknowledges completion of the transaction 848, to the auditing application, optionally indicating success or failure. Auditing application then returns to the step of detecting a new song 842. It should be understood in the above that the process or step of detecting a new song may encompass detecting any change in the audio stream that might indicate a transition to another audio segment, such as a song to a commercial, and thus in this scenario, a snippet of the commercial would be sent to the acoustic fingerprinting service provider for analysis.

In that there now are several embodiments that have been described which may independently transmit audio information to an acoustic fingerprinting service provider, such independent audio or fingerprint sources may be used as a double check against the audio content or acoustic fingerprints provided directly by the station to the acoustic fingerprinting service provider.

Of significant benefit, the physical plant associated with the prior art arrangements for providing radio station auditing is eliminated; specifically, the embodiment just described replaces the requirement to have a physical radio receiver and associated computer in a physical location geographically within radio reception range of the radio station in order to audit or monitor the content of a radio station.

Radio Station Syndicated Content Embodiments

Figure 15:
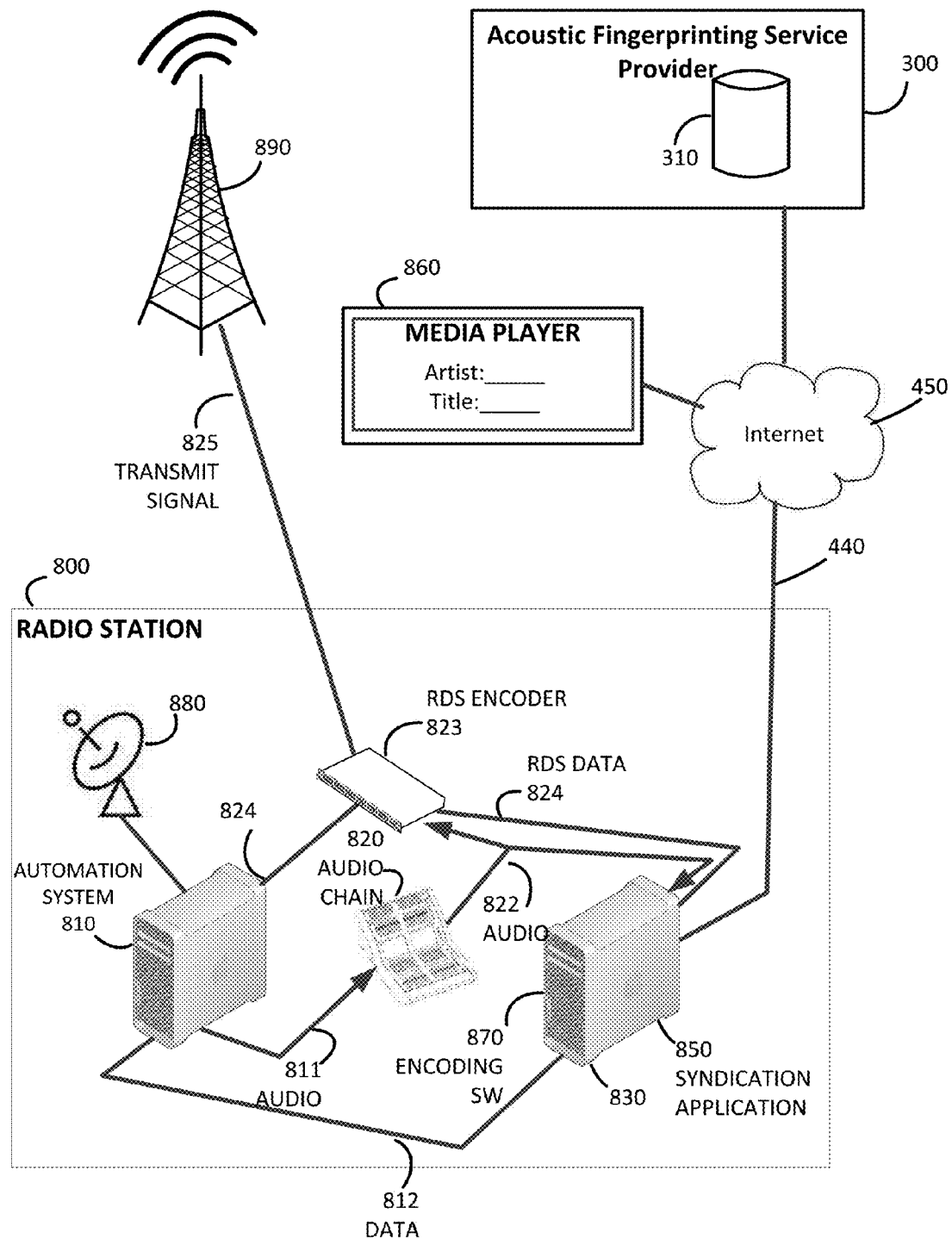
FIG. 15 is a schematic drawing illustrating an embodiment for radio stations to obtain artist and title metadata via an acoustic fingerprinting service provider for syndicated programs.

FIG. 15 is a schematic illustration of an embodiment to obtain artist and title metadata for radio stations broadcasting syndicated content.

There are circumstances in which the radio station and its systems do not possess the artist and title of songs being played. In one circumstance, songs are being played from CD, in which case, even though the name of the song may exist on the CD, the software and systems at the station do not have a mechanism to obtain that information, nor, if it were available, a mechanism to transmit that information on the terrestrial broadcast or on the simulcast. In another circumstance, the station is broadcasting syndicated content which is typically received via satellite from a remote feed; the remote feed most commonly does not have associated digital metadata to convey the artist and title of the current song, but even if it does, many stations receiving such a feed do not have the necessary equipment to receive the metadata feed and connect that metadata into the terrestrial broadcast or simulcast to make the metadata available to either radio receivers or to simulcast Internet listeners. In another circumstance, due to limitations of many commercially available broadcast automation systems, or due to the management of those systems by the radio station, the Artist and Title information frequently is mangled. Sometimes there are notes in those fields intended for use by the station's DJs or Program Directors. Sometimes the fields are too short to store the correct names, and so the information may abbreviated or truncated. There are many variations, but for a wide spectrum of situations, the Artist and Title information is unsuitable for presentation to the audience, whether by an RDS system for transmission of the metadata on the terrestrial broadcast, or via an encoder system to transmit the metadata in association with their Internet simulcast. As a result, radio receivers cannot present artist and title even if equipped to do so, and Internet media players similarly cannot present artist and title information for the songs that are played.

In this embodiment, a "desktop" or PC or server syndication application 850 is running in PC 830 at the radio station 800 (or other convenient location). The radio station 800 has a broadcast automation system 810 which maintains a repository of songs and commercials, and maintains the broadcast schedule. Typically a broadcast automation system plays songs and commercials from digital files stored on hard disk, in the process, converting the digital files into analog audio. That audio is output 811 to the station's audio chain 820 which provides desired enhancements. At stations providing RDS for transmitting artist and title and other information on the over-the-air broadcast, the audio chain 820 delivers the enhanced audio 822 to an RDS encoder 823. Automation system 810 provides digital output 824 on a serial or TCP connection wherein the digital output 824 contains the artist and title or other information the station would like to have appear on radio receivers. RDS encoder 823 impresses the digital data 824 onto a subcarrier which is merged with audio 822, resulting in transmit signal 825, ready for amplification for delivery to the antenna. This process would be similar for HD stations.

A radio station simulcasting on the Internet will have encoding software 870 running on a suitable computer such as PC 830, although this software could also run on the broadcast automation system 810. PC 830 receives the enhanced audio 822 from the audio chain, typically through the line-in input jack. The encoding software 870 attaches itself to the audio input, and encodes the audio into a digital format such as wma or mp3, suitable for media players on the Internet. The broadcast automation system 810 is the audio source 811 from which audio 822 is derived. Broadcast automation system 810 also delivers digital metadata via connection 812 to PC 830, typically via a TCP Ethernet connection. Metadata on connection 812 includes the artist and title of the currently playing song, and this metadata is delivered to encoding software 870 on PC 830. Encoding software 870 merges the artist and title metadata received on connection 812 with audio 822 into a composite digital output in a format such as wma or mp3. The encoded signal is output from PC 830 via broadband connection 440 to the Internet, and then via the Internet to each media player 860 connected to the simulcast stream of the radio station. The media player 860 decodes the composite digital wma or mp3 data stream into the audio and the metadata. The audio is converted into analog format and output through the media player's speakers or headphones, and the artist and title metadata is displayed on the media player's visual interface as the song is playing.

For a station broadcasting syndicated content, the broadcast automation system 810 receives a remote feed via satellite receiver 880 and its associated decoder system (not shown), which collectively provide the syndicated audio content to broadcast automation system 810. However, in the circumstances described for this embodiment, satellite receiver system 880 does not provide artist and title metadata in association with the syndicated audio, or, if it does, the systems at the radio station are not able to utilize that data. As a result, automation system 810 cannot provide digital metadata on connection 812 to encoding software 870, nor can it provide the digital RDS data 824 to the RDS encoder. Therefore, the radio station cannot provide artist and title metadata for either its terrestrial broadcast or its Internet simulcast.

In this embodiment, syndication application 850 in PC 830 is configured to receive a copy of the audio 822 from the line-in port. Software in the syndication application 850 detects changes in the nature of the audio content, such as from one song to another, from a song to DJ chatter, from DJ chatter to a commercial, or from one commercial to another to identify audio segments representing unique audio elements. In an optimized mode of operation, associated acoustic fingerprinting software of syndication application 850 fingerprints each identifiable segment of audio content. Fingerprints are transmitted via broadband connection 440 to the Internet and then to an acoustic fingerprinting service provider 300 that has a fingerprinting database of songs 310. The acoustic fingerprinting service provider looks up the fingerprint in its database 310 and obtains the artist and title of the song. The acoustic fingerprinting service provider 310 then sends the song metadata back to the syndication application 850 at the radio station 800 via the Internet.

In one arrangement of this embodiment, the syndication application 850 delivers that metadata to RDS encoder 824 for inclusion in the terrestrial broadcast.

In another arrangement, the syndication application 850 delivers that metadata to the encoder software 870. Encoder software 870 is then enabled to merge the artist and title information, derived from Internet resource 300, with audio 822 into a composite digital output in a format such as wma or mp3. Media players 860 then will receive the artist and title information for songs as they play, and are able to display that information for the benefit of the listener.

In another mode of operation of this embodiment, the acoustic fingerprinting service provider 300, directly or indirectly provides this metadata to Internet media players 860 of the radio station's content. In this embodiment, the media players 860, which typically are web page applications, separately connect to the acoustic fingerprinting service provider 300, or its delegate, and receive the metadata separately from the digital audio stream from encoding software 870. This metadata may optionally be provided in a proprietary format such that only the artist and title of the current song is displayed and requiring listeners to click through to a website of the acoustic fingerprinting service provider 300, or an associated entity, to obtain similar information for previously played songs.

Figure 16:
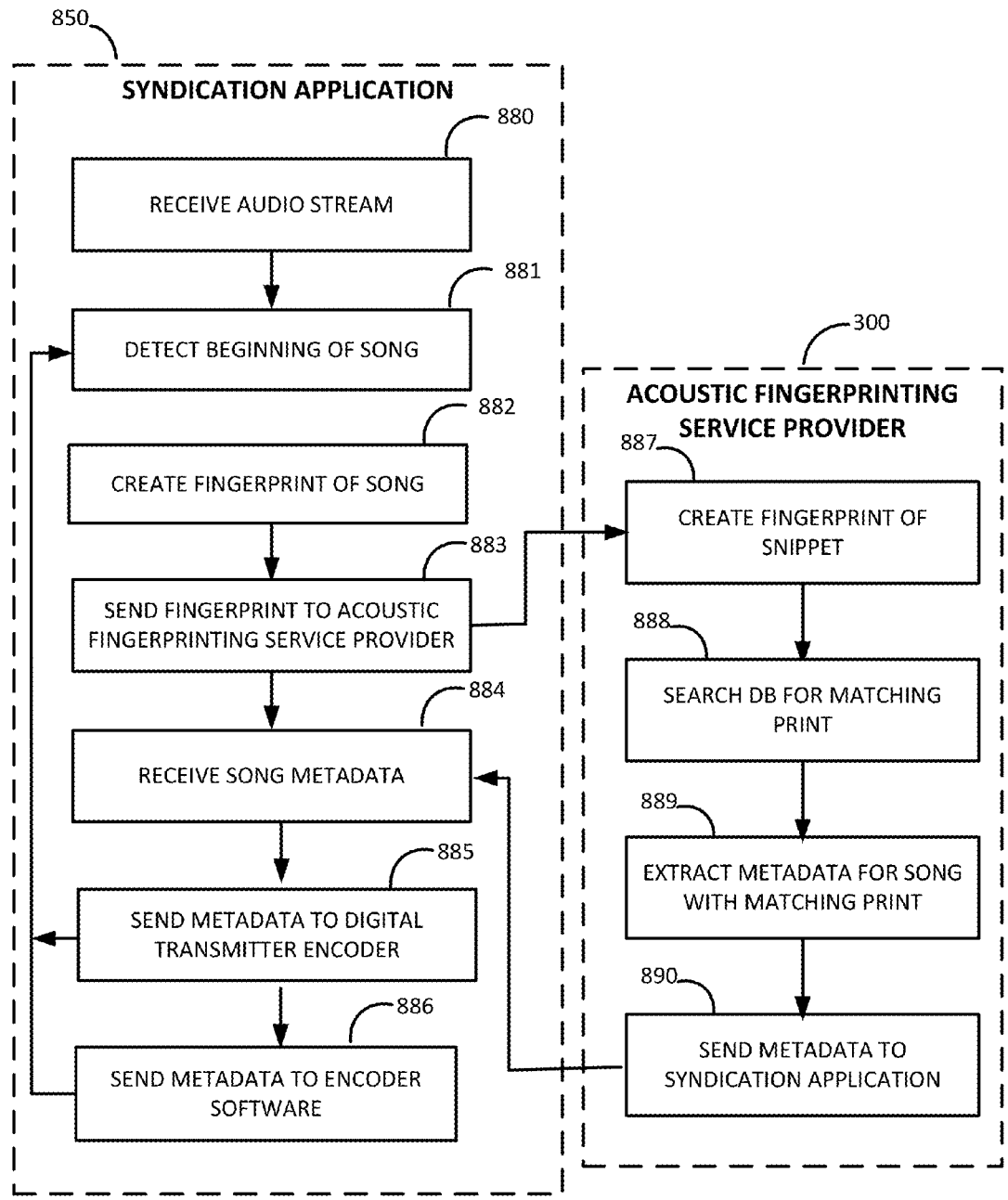
FIG. 16 is a flow chart illustrating one embodiment of a system for syndicated programs.

FIG. 16 is a flow chart for an embodiment to obtain artist and title metadata for radio stations broadcasting syndicated content from the perspective of syndication application 850. Syndication application 850 receives the audio stream 880, and detects the beginning of a song using DSP techniques 881, creates a fingerprint of the song 882, and sends the fingerprint to an acoustic fingerprinting service provider 883.

Optionally, the syndication application 850 may delay by longer than the duration of typical commercials before sending a fingerprint of a newly detected song to the acoustic fingerprinting service provider to avoid the lookup of songs that serve as background music to ads. If the fingerprint changes during the delay period, or if a new song is detected during the delay period, then the song that had been detected may have been a musical background to a commercial, and so is skipped by the syndication application 850.

Acoustic fingerprinting service provider receives the fingerprint 887, searches its fingerprint song database for a matching fingerprint 888, extracts the metadata for a song with a matching fingerprint 889, and sends the metadata that had been extracted back to the syndication application 890.

Syndication application 850 receives the metadata 884 from the service provider. In one mode of operation, syndication application 850 sends the metadata to an RDS encoder 885, or an equivalent encoder for HD Radio or similar digital transmission technique, and in another mode of operation, syndication application 850 sends the metadata 886 to the encoding software, and in a third mode of operation, syndication application 850 sends the metadata to an RDS encoder 885 and to the encoding software 886.

Optionally, the syndication application writes the metadata to a log file for subsequent reporting purposes, such as for payment of digital rights and copyright fees.

Optionally, instead of creating a fingerprint, the syndication application may detect the beginning of a song, and send a snippet of that song to the acoustic fingerprinting service provider for analysis, whereupon the service provider will create a fingerprint of the snippet.

Optionally, instead of detecting the beginning of a song and creating a fingerprint, the syndication application may send a continuous stream of audio to the acoustic fingerprinting service provider, wherein the service provider will determine the beginning of songs and create fingerprints.

Optionally, the syndication application may incorporate or have access to a local fingerprint song database. In this embodiment the syndication application detects the beginning of a song and creates a fingerprint, then looks up the fingerprint for a match in the local database.

Optional Embodiments

In an alternate mode of operation common to various embodiments disclosed herein, the listing of songs is provided to and maintained in a remote "cloud" account such as a Facebook account. The provisioning of the listing of songs to a cloud service may be performed by the app 210 or 170 or by the acoustic fingerprinting service provider 300.

Optionally, in embodiments wherein an embedded app communicates directly with an acoustic fingerprinting service provider, a registration process is used to associate the embedded app with an account, such as a business partner, or the user's smart phone app account. In this fashion the acoustic fingerprinting service provider is enabled to enforce access privileges via smart phone user accounts, or via business arrangements with radio receiver manufacturers, or via business arrangements with smartphone device manufacturers, or other arrangements that may arise. Similar processes are used today by network content providers such as Netflix and HuLu; these processes associate a particular hardware device with a user account established at the network portal of the content service provider, ensuring that content is only consumed by hardware devices possessed by the registered customer, or manufactured or sold by an authorized business partner.

Optionally, for convenience, the song ID app will search the user's repository of songs on the smart phone, and for those songs already in possession of the user, indicate that fact.

Optionally, rather than requiring the app to identify the beginnings of songs, the app sends the continuous audio stream to the service provider, and service provider performs the detection of the beginnings of songs in essentially the same fashion as described previously. In this mode of operation the service provider may have access to more sophisticated software and substantially greater computing power than what might be available in the smart phone, and so even though the uplink data transmission requirements would be higher because each smart phone would be sending a continuous stream of audio to the service provider, the service provider may benefit by being more capable to analyze the audio stream to determine when a new song is playing, as well as being able to detect and identify non-musical audio content such as spoken commercials and commercials of short duration.

Optionally, the song app may run in the background or in a minimized mode, absent a visual user interface, minimizing battery usage and enabling the use of other features of the smart phone while it is listening to a radio or to ambient sounds and collecting song information in the background. In this embodiment, the app does not show the song listings until the user activates the app to launch its GUI.

Optionally, the additional data beyond the song's artist and title may be provided by another data vendor, either accessed by the acoustic fingerprinting service provider, or by the song ID app, by the smart phone vendor, or some combination of these or other resources.

Optionally, the smart phone song ID app may delay by longer than the duration of typical commercials before sending a snippet of a newly detected song to the acoustic fingerprinting service provider to avoid the lookup of songs that serve as background music to ads.

Optionally when the song ID app 210 or embedded song ID app 170 potentially detects a song it may initiate communications to the acoustic fingerprinting service provider 300 with a message announcing the beginning of a new song, and as a further option, passing credentials to the acoustic fingerprinting service provider 300.

Optionally, the song ID app 210 may send a continuous stream of a newly detected song to the acoustic fingerprinting service provider 300 until notified by that service provider directly or indirectly to terminate the transmission of that stream. Notification to terminate the transmission may be by the provision of a response containing the name of the song.

Optionally, while some embodiments make specific reference to Bluetooth for communication between the radio receiver system and the smart phone, other wireless technologies for communicating between two devices may be equally suitable, Wi-Fi in particular.

Optionally, the radio receiver embodiments can perform the radio station auditing function as identified in the Description of Prior Art, if deployed to a suitably large number of client devices such that at least one client device is listening to each radio station at any given time. Thus the requirement for the installation and maintenance of thousands of dedicated radio receivers and computers in hundreds of locations can be substantially reduced or eliminated, particularly in more heavily populated listening areas.

Optionally, for embodiments utilizing a lookup of a segment of audio to discover a song title, the acoustic fingerprinting database may be incorporated into the radio system, syndication system, smart phone or application itself, along with the capability to create a fingerprint for audio content to be analyzed, and to search the local database for a match to the fingerprint that has been created. In these embodiments, rather than sending a snippet or continuous stream of audio to an Internet-based acoustic fingerprinting service provider, the smart phone or application creates the fingerprint from the audio snippet or stream, looks up the fingerprint in the song fingerprint database, and retrieves the title of the song along with any other metadata that might be available. The song ID app may be configured to periodically query an Internet resource to obtain updates to the fingerprinting database. An embedded song ID app, such as has been disclosed in a radio receiver embodiment, may similarly incorporate the song fingerprinting database, fingerprint creation, and lookup capability. In this embodiment, the embedded song ID app may be configured to operate in cooperation with a user's smart phone, and may, by a wireless networking connection such as Bluetooth, update the song ID app in the user's smart phone with song metadata that is discovered.

Optionally, for embodiments utilizing a lookup of a segment of audio to discover a song title, the capability to create a fingerprint for audio content to be analyzed may be incorporated into the smart phone itself, while the song database is maintained by a service provider accessible on the Internet. In this embodiment, rather than sending a snippet or continuous stream of audio to an Internet-based acoustic fingerprinting service provider, the smart phone song ID app creates the fingerprint for audio content to be analyzed. That fingerprint is then forwarded via the Internet to the acoustic fingerprinting service provider, which will look up the fingerprint in the song fingerprint database, retrieve the title of the song along with any other metadata that might be available, and return that information to the song ID app. Similarly, an embedded song ID app, such as has been disclosed in a radio receiver embodiment, may incorporate the capability to create a fingerprint for audio content to be analyzed, to forward that fingerprint to an acoustic fingerprinting service provider, to request that acoustic fingerprinting database provider to look up the fingerprint in the provider's database, and to return the song title and other available information. In this embodiment, the embedded song ID app may be configured to operate in cooperation with a user's smart phone, and may, by a wireless networking connection such as Bluetooth, update the song ID app in the user's smart phone with song metadata that is discovered.

Optionally, for embodiments utilizing a lookup of a segment of audio to discover a song title, the capability to create a fingerprint for audio content to be analyzed may be incorporated into the smart phone itself, and further, the process of attempting to create a fingerprint of an audio stream may be used to detect the presence music and the beginning of a new song; and, the ability or inability to create a stable fingerprint may be used to indicate the presence or lack of presence of music in the audio. This is because the mathematical DSP processes used for feature extraction from an audio source that enable beat detection and the detection of music are essentially subsets of the process of creating a fingerprint of an audio source. Thus, the process of attempting to create a fingerprint will be unstable, meaning the fingerprint will change widely over short periods of time (e.g. seconds), if the audio being examined does not have musical characteristics (i.e., lacks tonality, harmonicity, etc., as referenced previously). Thus the two steps or processes or systems or modules of detecting the presence of music and the beginning of a new song, and the creation of a fingerprint, are combined into a single step or process or system or module.

Optionally, the acoustic fingerprinting service provide may function as a service of a Personal Computer software application such as iTunes or Windows Media Player, wherein the PC software application maintains a fingerprint song database, or has remote access to such a database. Song ID app 210 communicates wirelessly to this PC software application. In various modes of operation, song detection may be performed within song ID app 210, and a snippet or continuous stream of the audio is transmitted to the PC software application; song ID app 210 may create an acoustic fingerprint of an audio stream, and transmit that fingerprint to the PC software application. The PC software application looks up the fingerprint in its local song fingerprint database, or communications the fingerprint to a remote database for lookup. Upon determining a match for the fingerprint in the database, the song artist and title information is delivered wirelessly from the PC software application to song ID app 210.

Important benefits of the embodiments incorporating a user smart phone: since the app has received the identification of every song played on an associated radio or heard by the user either through the smart phone or aurally, the smart phone song ID app can keep a record of each of those songs as well as the station or source, the time played, and even the geographic location of the user at the time the song played. It is also of benefit that this applies even for those stations or sources that provide artist and title information, including satellite radio. This enables the song ID app provider and the acoustic fingerprinting service provider the opportunity to offer for sale every song heard by the listener, even from sources which also offer their songs for sale.

Beneficially, the smart phone app can store and present more information than that which may be available in some environments, if any is available at all, and the acoustic fingerprinting service provider or other sources may be configured to provide extensive information for a large number of songs. Thus the song ID app holds additional intrinsic value, not only in that it is a centralized collection of musical information, but that it may offer the user a vast library of information regarding every song the user has heard. The song ID app also has the advantage of interactivity such that when the user goes back to look at the listings of songs that have played, the app may offer to play a snippet of a song, show additional "song discovery" information about the artists, songs, similar artists and songs, etc. Having that listing, it can offer the user a Like button to aid the user in keeping a listing of favorite songs, it can present advertising which may be targeted to the songs or the genres associated with those songs, and it can offer the user the ability to purchase the songs or the albums. This interactive arrangement also offers rich social networking opportunities to promote the songs and the song ID app itself from one user to another, thus expanding the business opportunities for the vendors providing the song ID services.

Having thus described the invention in rather full detail, it will be understood that such detail need not be strictly adhered to, but that further changes and modifications may suggest themselves to one skilled in the art falling within the scope of the present invention as defined by the subjoined claims.

What is claimed is:

1. A method of an acoustic fingerprinting system to identify the broadcast content of a radio station from representations of said broadcast content received via an Internet connection directly from a computer system at said radio station and to return identifiers of said broadcast content to said computer system at said radio station via said Internet connection, comprising the steps of:
   a. receiving an Internet connection directly from a computer system at a radio station wherein said computer system is electronically coupled to an audio source of said radio station, said audio source providing said computer system with the audio content currently playing on said radio station;
   b. receiving a representation of said currently playing audio content directly from said computer system at said radio station via said Internet connection, the representation comprising at least one of the following:
      i. a sample comprising a portion up to the entirety of said audio content;
      ii. an acoustic fingerprint of said audio content;
      iii. metadata describing said audio content;
   c. analyzing said representation of said currently playing audio content to recognize and identify said audio content; and,
   d. sending the identification of said recognized audio content to said computer system at said radio station via said Internet connection, the identification of a song recognized within said audio content to include the artist and tile of the song;
   whereby the computer system at the radio station is enabled to obtain the artist and title of songs currently being broadcast.

2. A method of an acoustic fingerprinting system as described in claim 1 further comprising receiving an identification of said radio station from said computer system at said radio station via said Internet connection.

3. A non-transitory machine-readable medium containing processor readable code for programming a processor for use in operating an acoustic fingerprinting system to identify the broadcast content of a radio station from representations of said broadcast content received via an Internet connection directly from a computer system at said radio station and to return identifiers of said broadcast content to said computer system at said radio station via said Internet connection, comprising:
   a. a routine to receive an Internet connection directly from a computer system at a radio station wherein said computer system is electronically coupled to an audio source of said radio station, said audio source providing said computer system with the audio content currently playing on said radio station;
   b. a routine to receive a representation of said currently playing audio content directly from said computer system at said radio station via said Internet connection, the representation comprising at least one of the following:
      i. a sample comprising a portion up to the entirety of said audio content;
      ii. an acoustic fingerprint of said audio content;
      iii. metadata describing said audio content;
   c. a routine to analyze said representation of said currently playing audio content to recognize and identify said audio content; and,
   d. a routine to send the identification of said recognized audio content to said computer system at said radio station via said Internet connection, the identification of a song recognized within said audio content to include the artist and tile of the song;
   whereby the computer system at the radio station is enabled to obtain the artist and title of songs currently being broadcast.

4. A non-transitory machine-readable medium containing processor readable code for programming a processor for use in operating an acoustic fingerprinting system as described in claim 3 further comprising a routine to receive an identification of said radio station from said computer system at said radio station via said Internet connection.

5. A system of an acoustic fingerprinting system to identify the broadcast content of a radio station from representations of said broadcast content received via an Internet connection directly from a computer system at said radio station and to return identifiers of said broadcast content to said computer system at said radio station via said Internet connection, comprising:
   a. a system of an acoustic fingerprinting system configured to receive an Internet connection directly from a computer system at a radio station wherein said computer system is electronically coupled to an audio source of said radio station said audio source providing said computer system with the audio content currently playing on said radio station;
   b. the system of the acoustic fingerprinting system further configured to receive a representation of said currently playing audio content directly from said computer system at said radio station via said Internet connection, the representation comprising at least one of the following:
      i. a sample comprising a portion up to the entirety of said audio content;
      ii. an acoustic fingerprint of said audio content;
      iii. metadata describing said audio content;
   c. the system of the acoustic fingerprinting system further configured to analyze said representation of said currently playing audio content to recognize and identify said audio content;
   d. the system of the acoustic fingerprinting system further configured to send the identification of said recognized audio content to said computer system at said radio station via said Internet connection, the identification of a song recognized within said audio content to include the artist and tile of the song;
   whereby the radio station is enabled to obtain the artist and title of songs currently being broadcast.

6. A system of an acoustic fingerprinting system as described in claim 5 further configured to receive an identification of said radio station from said computer system at said radio station via said Internet connection.

* * * * *